(12) United States Patent
Murakami

(10) Patent No.: US 8,553,291 B2
(45) Date of Patent: Oct. 8, 2013

(54) COPY-FORGERY-INHIBITED PATTERN IMAGE GENERATION METHOD AND IMAGE PROCESSING APPARATUS

(75) Inventor: Tomochika Murakami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/239,878

(22) Filed: Sep. 22, 2011

(65) Prior Publication Data

US 2012/0008152 A1    Jan. 12, 2012

Related U.S. Application Data

(63) Continuation of application No. 10/940,637, filed on Sep. 15, 2004, now Pat. No. 8,049,933.

(30) Foreign Application Priority Data

Sep. 17, 2003 (JP) ................................. 2003-324690
Nov. 19, 2003 (JP) ................................. 2003-389661

(51) Int. Cl.
G06F 3/12     (2006.01)
H04N 1/387    (2006.01)
H04N 1/00     (2006.01)
B41J 29/393   (2006.01)

(52) U.S. Cl.
USPC ......... 358/300; 358/1.15; 358/1.14; 358/450; 358/406; 358/504; 347/19; 347/14

(58) Field of Classification Search
USPC ............................ 358/300, 1.15, 1.9; 382/100
See application file for complete search history.

(56) References Cited

U.S. PATENT DOCUMENTS

| | | |
|---|---|---|
| 4,995,143 A | 2/1991 | Demura et al. |
| 5,197,765 A | 3/1993 | Mowry, Jr. et al. |
| 5,377,013 A | 12/1994 | Oka et al. |
| 5,410,642 A | 4/1995 | Hakamatsuka et al. |
| 5,444,544 A | 8/1995 | Oka et al. |
| 5,853,197 A | 12/1998 | Mowry, Jr. et al. |
| 5,917,511 A * | 6/1999 | Ueda ............................... 347/19 |
| 6,000,728 A | 12/1999 | Mowry, Jr. |
| 6,396,927 B1 | 5/2002 | Phillips |
| 6,512,915 B2 | 1/2003 | Matsunoshita et al. |
| 6,535,307 B1 * | 3/2003 | Allen et al. .................... 358/504 |
| 6,606,167 B1 | 8/2003 | Rees et al. |
| 6,768,558 B1 | 7/2004 | Yamashita et al. |

(Continued)

FOREIGN PATENT DOCUMENTS

| | | |
|---|---|---|
| JP | 63-062797 | 3/1988 |
| JP | 5-048885 A | 2/1993 |

(Continued)

*Primary Examiner* — Akwasi M Sarpong
(74) *Attorney, Agent, or Firm* — Fitzpatrick, Cella, Harper & Scinto

(57) ABSTRACT

A combination of a latent-image pattern which forms a latent-image part and a background pattern that forms a background-image part is determined so that the latent-image part and background-image part have equal print densities. The determined latent-image pattern and background pattern, color information used to determine a color of the copy-forgery-inhibited pattern image, input image information as an image to be processed, copy-forgery-inhibited pattern basic information used to designate the latent-image part and background-image part, and camouflage region designation image information used to designate a camouflage region are input. A copy-forgery-inhibited pattern image is generated on the basis of the input information.

18 Claims, 28 Drawing Sheets

(56) References Cited

U.S. PATENT DOCUMENTS

| | | |
|---|---|---|
| 6,801,636 B2 | 10/2004 | Murakami et al. |
| 6,804,027 B2 | 10/2004 | Lee et al. |
| 6,826,290 B1 | 11/2004 | Murakami et al. |
| 6,873,711 B1 | 3/2005 | Murakami et al. |
| 6,885,755 B2 | 4/2005 | Yamaguchi |
| 6,993,148 B1 | 1/2006 | Miyashita et al. |
| 7,006,257 B1 | 2/2006 | Yamazaki et al. |
| 7,027,179 B2 | 4/2006 | Mori |
| 7,027,181 B2 | 4/2006 | Takamori |
| 7,039,215 B2 | 5/2006 | Suzaki |
| 7,061,652 B2 | 6/2006 | Kurita et al. |
| 7,085,399 B2 | 8/2006 | Suzaki |
| 7,227,661 B2 * | 6/2007 | Matsunoshita ............. 358/1.15 |
| 7,243,952 B2 | 7/2007 | Shimada et al. |
| 7,274,890 B2 | 9/2007 | Uchida et al. |
| 7,301,654 B2 | 11/2007 | Matsunoshita et al. |
| 7,307,761 B2 | 12/2007 | Man |
| 7,411,700 B2 | 8/2008 | Johnson |
| 7,450,895 B2 | 11/2008 | Oomura et al. |
| 7,599,099 B2 | 10/2009 | Tamaru |
| 2001/0040980 A1 | 11/2001 | Yamaguchi |
| 2002/0002679 A1 | 1/2002 | Murakami et al. |
| 2002/0018223 A1 | 2/2002 | Kashihara |
| 2002/0018228 A1 | 2/2002 | Torigoe |
| 2002/0033966 A1 | 3/2002 | Lee et al. |
| 2002/0054317 A1 * | 5/2002 | Matsunoshita et al. ...... 358/1.14 |
| 2002/0067506 A1 | 6/2002 | Ryu |
| 2002/0071130 A1 | 6/2002 | Takamori |
| 2003/0020973 A1 | 1/2003 | Kondo |
| 2003/0081274 A1 | 5/2003 | Yamamoto |
| 2003/0123698 A1 | 7/2003 | Murakami |
| 2003/0142360 A1 | 7/2003 | Johnson et al. |
| 2003/0161536 A1 | 8/2003 | Iwamura et al. |
| 2003/0179399 A1 | 9/2003 | Matsunoshita |
| 2003/0179412 A1 | 9/2003 | Matsunoshita |
| 2003/0210419 A1 | 11/2003 | Reese et al. |
| 2004/0001164 A1 | 1/2004 | Murakami |
| 2004/0001609 A1 | 1/2004 | Murakami |
| 2004/0001610 A1 | 1/2004 | Murakami |
| 2004/0021311 A1 | 2/2004 | Shimada et al. |
| 2004/0028256 A1 | 2/2004 | Murakami |
| 2004/0051885 A1 | 3/2004 | Matsunoshita |
| 2004/0114190 A1 | 6/2004 | Man |
| 2004/0145661 A1 | 7/2004 | Murakami et al. |
| 2004/0196503 A1 | 10/2004 | Kurtenbach et al. |
| 2005/0058476 A1 | 3/2005 | Murakami |
| 2005/0078993 A1 | 4/2005 | Oomura et al. |
| 2005/0088672 A1 | 4/2005 | Johnson |
| 2006/0268311 A1 | 11/2006 | Tamaru |
| 2007/0065208 A1 | 3/2007 | Uchida et al. |
| 2009/0284782 A1 * | 11/2009 | Murakami ................... 358/1.14 |

FOREIGN PATENT DOCUMENTS

| | | |
|---|---|---|
| JP | 06-068051 | 3/1994 |
| JP | 07-231384 | 8/1995 |
| JP | 8-244389 A | 9/1996 |
| JP | 08-310013 | 11/1996 |
| JP | 09-136480 | 5/1997 |
| JP | 10-278408 | 10/1998 |
| JP | 2001-197297 | 7/2001 |
| JP | 2001-238075 | 8/2001 |
| JP | 2001-309169 | 11/2001 |
| JP | 2001-324898 | 11/2001 |
| JP | 2001-346032 | 12/2001 |
| JP | 2001-346033 | 12/2001 |
| JP | 2001-346034 | 12/2001 |
| JP | 2002-023572 | 1/2002 |
| JP | 2002-044430 A | 2/2002 |
| JP | 2002-077571 | 3/2002 |
| JP | 2002-099870 | 4/2002 |
| JP | 2002-101291 | 4/2002 |
| JP | 2002-225381 | 8/2002 |
| JP | 2002-237940 | 8/2002 |
| JP | 2002-262055 | 9/2002 |
| JP | 2002-305646 | 10/2002 |
| JP | 2003-101762 | 4/2003 |
| JP | 2003-280469 | 10/2003 |
| JP | 2004-304597 A | 10/2004 |
| JP | 2005-130114 A | 5/2005 |
| JP | 2005-130115 A | 5/2005 |
| JP | 2005-130116 A | 5/2005 |

* cited by examiner

FIG. 3

| 6 | 7 | 8 | 9 |
|---|---|---|---|
| 5 | 0 | 1 | 10 |
| 4 | 3 | 2 | 11 |
| 15 | 14 | 13 | 12 |

F I G. 5

| 0 | 8 | 2 | 10 |
|---|---|---|---|
| 12 | 4 | 14 | 6 |
| 3 | 11 | 1 | 9 |
| 15 | 7 | 13 | 5 |

FIG. 7

| LATENT-IMAGE PART | BACKGROUND-IMAGE PART |
|---|---|
| X_L ⟶ ■ }Y_L | X_S ⟶ ▪▪/▪▪ }Y_S |
| T_L=N_L/(X_K*Y_L) | T_S=N_S/(X_S*Y_S) |

FIG. 9
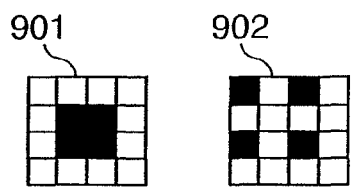
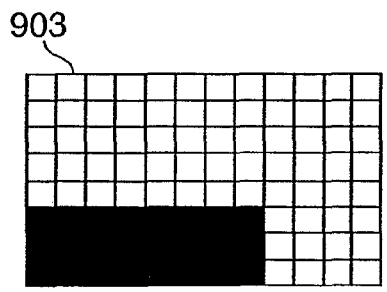
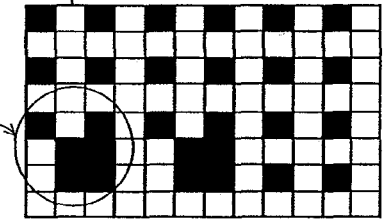
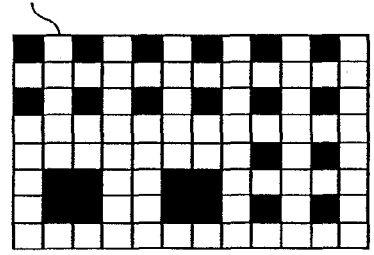

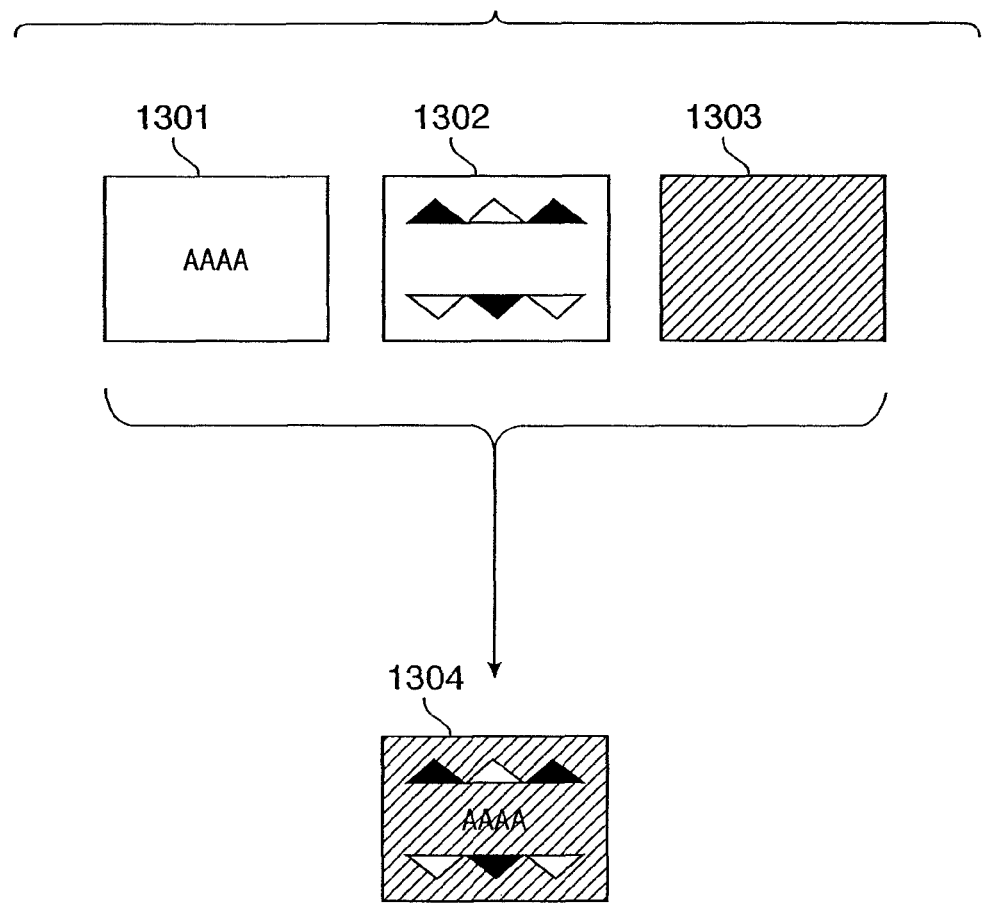

FIG. 20
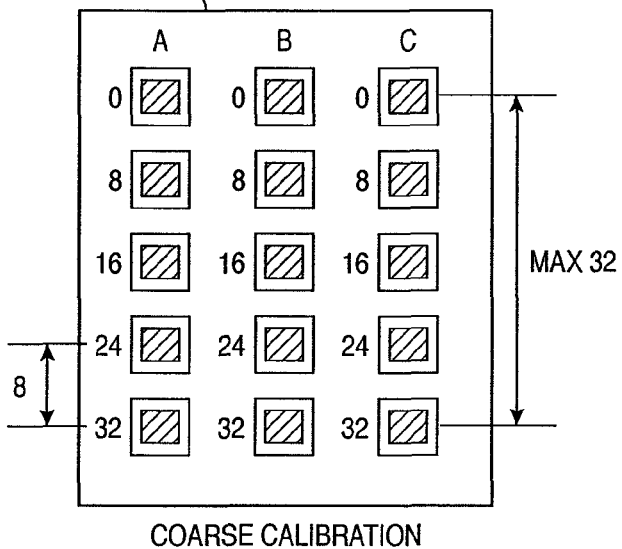
COARSE CALIBRATION
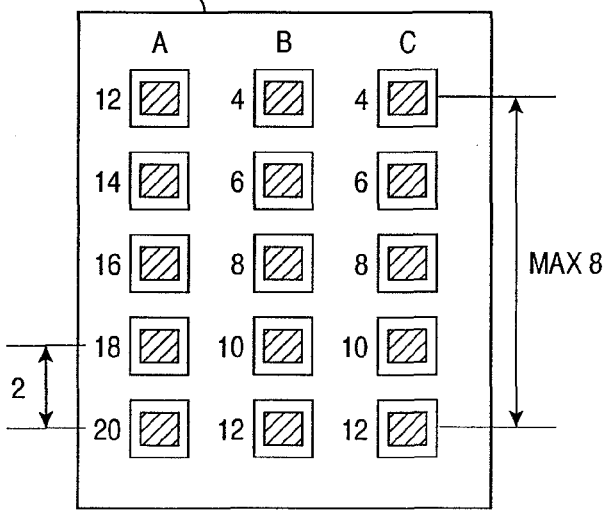
FINE CALIBRATION

COPY-FORGERY-INHIBITED PATTERN IMAGE GENERATION METHOD AND IMAGE PROCESSING APPARATUS

This application is a continuation of U.S. patent application Ser. No. 10/940,637, filed Sep. 15, 2004, and allowed Jul. 25, 2011.

FIELD OF THE INVENTION

The present invention relates to a technique for compositing a copy-forgery-inhibited pattern on the background of a document, and outputting a composite document for the purpose of deterring illicit forgery and information leakage due to copies of important documents.

BACKGROUND OF THE INVENTION

On some receipts, securities, and certificates, a special pattern which emerges as a character string or image when they are copied is printed on the background, so as to prevent them from being readily copied. Such special pattern is generally called a "copy-forgery-inhibited pattern", which applies a mechanism that does not allow an original to be readily copied, thus psychologically deterring a copy of an original.

This copy-forgery-inhibited pattern is formed of two regions having an identical density, i.e., a region where dots remain after copying and a region where dots disappear after copying. These two regions have substantially the same densities, and a hidden character string or image such as "COPY" cannot be seemingly recognized macroscopically, but these regions microscopically have different properties. Note that the hidden character string or image will be referred to as a "latent-image" hereinafter.

For example, the region where dots remain after copying (this region will be referred to as a latent-image part or region hereinafter) is formed of groups of dots where dots are concentrated, and the region where dots disappear or become lighter than the latent-image part after copying (this region will be referred to as a background-image part or region hereinafter) is formed of scattered dots. In this manner, the two regions which have substantially the same densities but different properties can be created.

The concentrated dots and scattered dots can be generated by halftoning using halftone dot screens with different screen ruling values or dithering using dither matrices having different features as an image process.

In halftoning, a halftone dot screen with a low screen ruling value is preferably used to obtain the concentrated dot layout, and a halftone dot screen with a high screen ruling value is preferably used to obtain the scattered dot layout.

In the dithering using a dither matrix, a dot-concentration dither matrix is preferably used to obtain the concentrated dot layout, and a dot-scattering dither matrix is preferably used to obtain the scattered dot layout.

Therefore, when a copy-forgery-inhibited pattern image is generated using the aforementioned halftoning, halftoning with a low screen ruling value is suited to a latent-image part, and halftoning with a high screen ruling value is suited to a background-image part. When a copy-forgery-inhibited pattern image is generated using the aforementioned dithering, dithering using a dot-concentration dither matrix is suited to a latent-image part, and dithering using a dot-scattering dither matrix is suited to a background-image part.

In general, a copying machine suffers a limitation on image reproduction performance depending on the input resolution upon reading small dots of a document to be copied or the output resolution upon reproducing small dots. Therefore, when a document includes isolated small dots beyond the limitation on the image reproduction performance of the copying machine, these small dots cannot be perfectly reproduced on its copy, and the isolated small dots disappear.

That is, when the background-image part which forms the copy-forgery-inhibited pattern image is designed to exceed the limitation of dots that can be reproduced by the copying machine, large dots (concentrated dots) of the copy-forgery-inhibited pattern can be reproduced by copying, but small dots (scattered dots) cannot be reproduced. Hence, a hidden image (latent-image) emerges. Also, even when scattered dots do not completely disappear after copying, if they have an apparent density difference from concentrated dots after copying, a hidden image (latent-image) emerges.

In the copy-forgery-inhibited pattern, a technique called "camouflage" which makes it harder to recognize a hidden character string or image as a latent-image is well known. This camouflage technique is a method of laying out a pattern which has a density different from that of the latent-image part and background-image part on the entire copy-forgery-inhibited pattern image. This technique has an effect of macroscopically emphasizing the camouflage pattern with a density different from that of the latent-image part and background-image part, and further obscuring a latent-image at a glance.

The copy-forgery-inhibited pattern with the camouflage pattern has an effect of giving a decorative impression to a print compared to a copy-forgery-inhibited pattern without any camouflage pattern. Dots inside the camouflage pattern preferably disappear as much as possible so as to allow easy recognition of a latent-image after copying. In case of the simplest implementation, camouflage can be realized by printing no dots at positions corresponding to the camouflage pattern.

An overview of the copy-forgery-inhibited pattern has been explained.

Conventionally, a print paper vendor prints a copy-forgery-inhibited pattern including a character string or image (latent-image) such as "COPY" or the like on dedicated sheets, and sells such sheets as copy-inhibition paper sheets. The government and other public offices, and companies buy such copy-inhibition paper sheets, and print documents whose authenticity is to be guaranteed on copy-inhibition paper sheets, thus deterring copies of prints.

Since the aforementioned copy-inhibition paper sheets are marketed as pre-print sheets by pre-printing a copy-forgery-inhibited pattern image on dedicated sheets by a print paper vendor, users have demerits in terms of cost such as cost produced upon using dedicated sheets, cost produced upon preparing pre-print sheets more than necessary, and the like.

By contrast, in recent years, a technique for creating a copy-forgery-inhibited pattern image by software, and outputting a composite document of that copy-forgery-inhibited pattern image and contents image using a laser printer (to be referred to as "on-demand copy-forgery-inhibited pattern output method by printer" hereinafter) has been realized (e.g., see patent reference 1: Japanese Patent Laid-Open No. 2001-197297).

With this on-demand copy-forgery-inhibited pattern output method by a printer, since a document with a copy-forgery-inhibited pattern image can be printed using plain paper, only a required number of documents with a copy-forgery-inhibited pattern image on their backgrounds can be printed when needed. Therefore, copy-inhibition paper sheets need not be prepared more than necessary unlike in the conventional method. That is, the on-demand copy-forgery-inhibited pattern output method by a printer can greatly reduce cost of sheets compared to the conventional document copy-deterrence method using copy-inhibition paper sheets.

The user of the conventional copy-inhibition paper sheets can use only a character string or image (latent-image) prepared in advance by the print paper vendor or a made-to-order hidden character string or image (latent-image).

However, with the on-demand copy-forgery-inhibited pattern output method by a printer, the user can generate a copy-forgery-inhibited pattern image including an arbitrary hidden character string or image (latent-image) by a software process for each print, and can print it on-demand using a printer. Hence, the user can freely customize a hidden character string or image (latent-image).

By exploiting a merit of on-demand selection of a latent-image, not only a corporation logo mark or a character string "VOID", which is used conventionally, but also various kinds of information such as a serial number or IP address used to identify an output printer, a computer name or IP address used to identify a computer that issues a print command, a user name or login name used to identify a user who issues a print command, a print job number, print date, print location, the file name of a digital document, and the like used to identify when and by whom a print process is done, and so forth can be selected as an image or character string to be embedded as a latent-image.

As a result, the on-demand copy-forgery-inhibited pattern output method by a printer can implement an advanced tracking function that cannot be implemented by the conventional pre-printed copy-inhibition paper sheets.

In the on-demand copy-forgery-inhibited pattern output method by a printer, the generation timing of a copy-forgery-inhibited pattern image is processed mainly using a personal computer (PC) or workstation, and a printer controller for some processes. However, computers and printers include various models, i.e., from a model having high computation performance and a sufficiently large memory size to a model having poor computation performance and a small memory size.

Even if a computer and printer have sufficiently high performance, assuming that a high-resolution copy-forgery-inhibited pattern image is to be generated in large quantities, the computation volume and memory size required to generate a copy-forgery-inhibited pattern image are preferably reduced as much as possible.

Patent reference 1 that describes the on-demand copy-forgery-inhibited pattern output method by a printer also describes a method of reducing the computation volume and memory size upon generation of a copy-forgery-inhibited pattern image. However, patent reference 1 can achieve reductions of the computation volume and memory size in some processes, but cannot achieve both reductions of the computation volume and memory size and high image quality.

For example, patent reference 1 describes a method of executing a process for separating a color main image as contents such as a document or the like into color components such as Y, M, C, and K or the like, and compositing a copy-forgery-inhibited pattern image as a monochrome image in a designated color component of the main image upon compositing the main image and copy-forgery-inhibited pattern image.

However, for example, if a color component in which the copy-forgery-inhibited pattern image is to be embedded is C (cyan) and the copy-forgery-inhibited pattern image is to be composited to the C component of the color main image, only when other color components of the color main image are zero, the color of the color main image composited with the copy-forgery-inhibited pattern image is output as cyan. Otherwise, cyan is mixed with other color components and a mixed-color copy-forgery-inhibited pattern may be output (for example, mixing of cyan and yellow generates green).

Patent reference 1 does not describe any method of compositing a copy-forgery-inhibited pattern image in an accurate color to only a designated region (coordinate position, color component) of an input image.

In patent reference 1, a camouflage pattern and background image are integrated in advance, and error diffusion is applied to the integrated background image with the camouflage pattern to generate a binarized background image. However, the camouflage pattern in the background image binarized by error diffusion may suffer positional deviation from that in a multi-valued background image.

Error diffusion is a method of ON/OFF of a dot by comparing the sum of the pixel value of a pixel to be binarized and errors distributed from surrounding pixels to that pixel value with a predetermined threshold value. However, error diffusion suffers known problems, e.g., "delay of dot generation" (errors are sufficiently accumulated in black dot generation at the leading end of a low-density region or white dot generation at the leading end of a high-density region and dot generation delays considerably until dots are fixed down to a steady state), "excessive diffusion" (errors accumulated in large quantities are diffused to outside a region), and the like.

Therefore, even when error diffusion is applied to a background image with a camouflage pattern to generate a binary background image with a camouflage pattern, "delay of dot generation" and "excessive diffusion" may occur in pixels around the camouflage pattern.

When halftoning is applied to a latent-image part designated by a mask image, e.g., ON/OFF of a dot is determined by comparing the pixel value of a background image and a threshold matrix value, "delay of dot generation" and "excessive diffusion" as problems of error diffusion do not occur.

Therefore, a camouflage pattern obtained as a result of error diffusion may not match that as a result of halftoning at their boundaries.

Patent reference 1 also describes a method of applying halftoning to a latent-image part to binarize it, and binarizing the entire background image including the latent-image part by error diffusion. However, in this case, dots generated by error diffusion get into the latent-image region to disturb the boundary between the latent-image region and background region, thus impairing the quality of the copy-forgery-inhibited pattern image.

Therefore, the conventional method does not sufficiently consider any efficient computation volume/memory size reduction method upon generation of a copy-forgery-inhibited pattern image while maintaining high image quality of the copy-forgery-inhibited pattern image.

As described above, many efforts have been made in the copy-forgery-inhibited pattern to make it harder to recognize a latent-image. The camouflage technique is one of such efforts.

However, the on-demand copy-forgery-inhibited pattern output method by a printer is susceptible to density variations of a printer. In addition to the camouflage technique, efforts that make it harder to recognize a latent-image are required even when the density variations of a printer have occurred.

SUMMARY OF THE INVENTION

The present invention has been made to solve the aforementioned problems, and has as its object to achieve high-speed, memory-saving generation of a copy-forgery-inhibited pattern image under the assumption that a copy-forgery-inhibited pattern image is generated in environments using various computers and printers.

It is another object of the present invention to provide an adequately camouflaged copy-forgery-inhibited pattern image free from any disturbance, which cannot be obtained by the prior art.

It is still another object of the present invention to generate a copy-forgery-inhibited pattern image that can make harder to recognize a latent-image.

In order to achieve the above objects, according to one aspect of the present invention, there is provided a copy-forgery-inhibited pattern image generation method in an image processing apparatus for generating a copy-forgery-inhibited pattern image including a latent-image part and background-image part, comprising:

a step of determining a combination of a latent-image pattern which forms the latent-image part and a background pattern that forms the background-image part so that the latent-image part and background-image part have equal print densities;

a step of inputting the determined latent-image pattern and background pattern, color information used to determine a color of the copy-forgery-inhibited pattern image, input image information as an image to be processed, copy-forgery-inhibited pattern basic information used to designate the latent-image part and background-image part, and camouflage region designation image information used to designate a camouflage region; and a step of generating the copy-forgery-inhibited pattern image on the basis of the input information.

According to one aspect of the present invention, there is provided a copy-forgery-inhibited pattern image generation method for generating a copy-forgery-inhibited pattern image including a latent-image part which is reproduced upon copying, and a background-image part which disappears upon copying, comprising:

dividing the latent-image part into a plurality of regions; and controlling a dot layout to lay out dots which are reproduced upon copying on at least one region of the plurality of regions, and not to lay out the dots on at least one region different from the at least one region.

According to one aspect of the present invention, there is provided an image processing apparatus for generating a copy-forgery-inhibited pattern image including a latent-image part and background-image part, comprising:

means for determining a combination of a latent-image pattern which forms the latent-image part and a background pattern that forms the background-image part so that the latent-image part and background-image part have equal print densities;

means for inputting the determined latent-image pattern and background pattern, color information used to determine a color of the copy-forgery-inhibited pattern image, input image information as an image to be processed, copy-forgery-inhibited pattern basic information used to designate the latent-image part and background-image part, and camouflage region designation image information used to designate a camouflage region; and means for generating the copy-forgery-inhibited pattern image on the basis of the input information.

According to one aspect of the present invention, there is provided an image processing apparatus for generating a copy-forgery-inhibited pattern image including a latent-image part which is reproduced upon copying, and a background-image part which disappears upon copying, comprising:

control means for dividing the latent-image part into a plurality of regions, and controlling a dot layout to lay out dots which are reproduced upon copying on at least one region of the plurality of regions, and not to lay out the dots on at least one region different from the at least one region.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 shows an example of a 4×4 spiral dither matrix;

FIG. 5 shows an example of a 4×4 Bayer dither matrix;

FIG. 7 is a view for comparing the area ratios of a background threshold pattern and latent-image threshold pattern;

FIG. 9 is a view showing the generation process of a copy-forgery-inhibited pattern image using a copy-forgery-inhibited pattern compositing/printing apparatus shown in FIG. 1;

FIG. 13 is a view showing a composition process of an input document image and copy-forgery-inhibited pattern image;

FIG. 20 shows two different types of sheets used in the test printing process, the processing sequence of which is shown in FIG. 19;

DETAILED DESCRIPTION OF THE PREFERRED EMBODIMENTS

Figure 1:
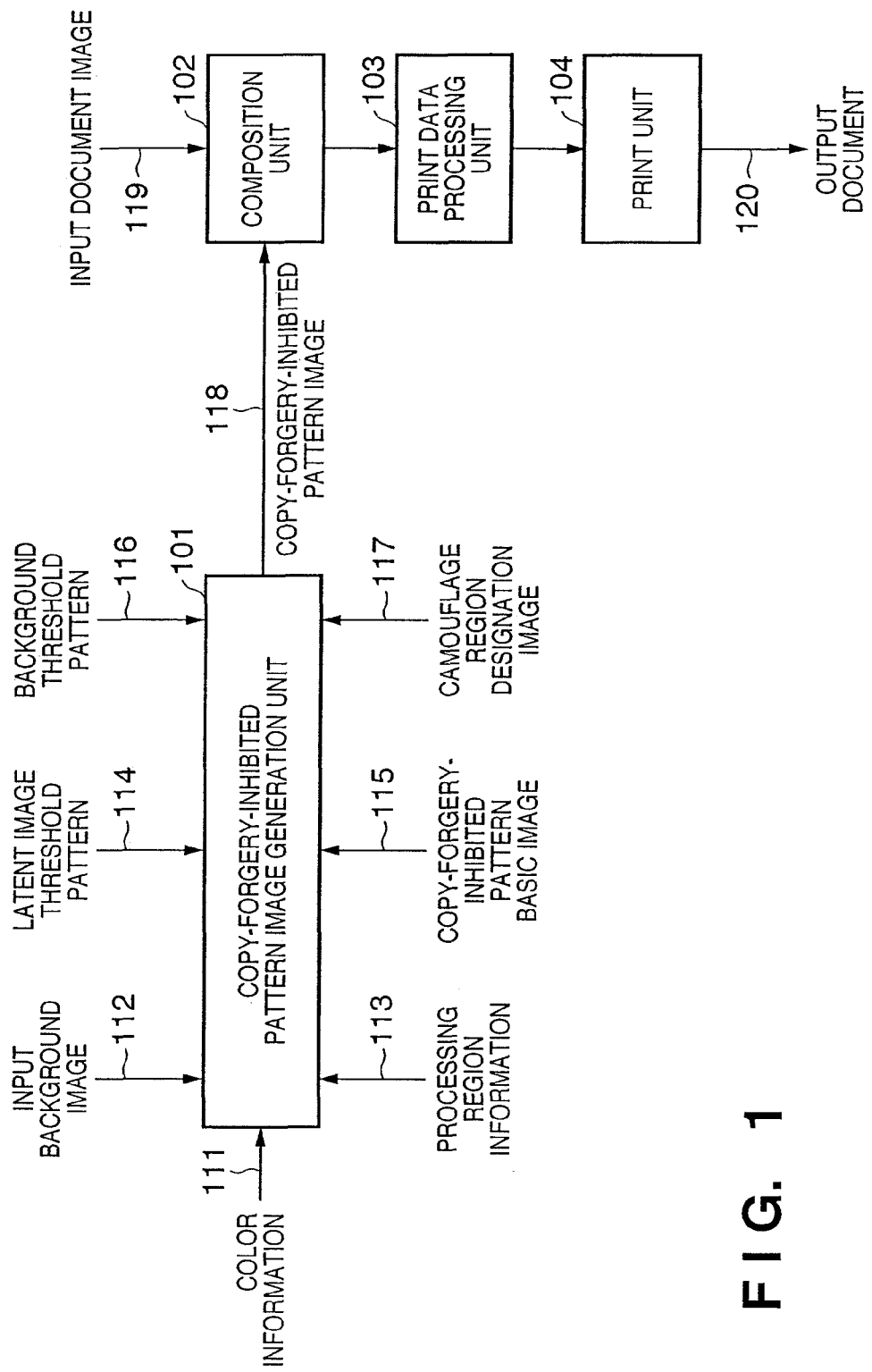
FIG. 1 is a block diagram showing the internal process of a copy-forgery-inhibited pattern compositing/printing apparatus according to the first embodiment.

The best mode of carrying out the invention will be described in detail hereinafter with reference to the accompanying drawings. In this embodiment, an image corresponding to a background-image part is designed to discretely lay out dots using a dot-scattering dither matrix, and an image corresponding to a latent-image part is designed to concentratedly lay out dots using a dot-concentration dither matrix.

The background-image part will be explained as a "region which disappears" upon copying for the descriptive convenience of the present invention. However, the present invention is not limited to this. For example, the background-image part may be printed to have a lower density than the latent-image part, so that when a print formed with a copy-forgery-inhibited pattern image is copied by a copying machine, a person can recognize that the obtained copy is not an original (the print formed with the copy-forgery-inhibited pattern image) by the visualized latent-image part. That is, an image of the background-image part need not "disappear" from the copy, and need only have a density level that allows the user to identify the latent-image part.

A dither matrix used to generate an image of the background-image part will be referred to as a background dither matrix hereinafter, and a dither matrix used to generate an image of the latent-image part will be referred to as a latent-image dither matrix hereinafter.

Dithering is a method of comparing a multi-valued input image signal with a threshold value calculated according to a given rule, and outputting a binary image based on their magnitude relationship. A dither matrix is a threshold matrix in which threshold values used to binarize an input image signal by dithering are two-dimensionally laid out.

By binarizing the pixel values of an input image signal by corresponding threshold values of the dither matrix, a binary image (threshold pattern) is obtained. In the binary image to be obtained, when the gray level of the input image signal is less than a threshold value of the dither matrix, one bit (e.g., 1) is assigned to the pixel value; when the gray level is equal to or larger than the threshold value, the other bit (e.g., 0) is assigned.

In this embodiment, a binary image which forms the background-image part, and a binary image which forms the latent-image part are generated in advance by dithering by inputting appropriate input image signals, so that the background-image part and latent-image part have substantially the same densities when they are printed on a paper sheet using a printer.

A method of generating a background threshold pattern and latent-image threshold pattern, which can set the background-image part and latent-image part to have substantially the same densities upon printing on a paper sheet using a printer will be described in detail later.

In the following description, a binary image that forms the background-image part will be referred to as a background threshold pattern, and a binary image that forms the latent-image part will be referred to as a latent-image threshold pattern.

First Embodiment

In this embodiment, a combination of a background threshold pattern and latent-image threshold pattern as patterns (binary images) which form the background-image part and latent-image part and can set equal densities for the background-image part and latent-image part upon printing is determined in advance, and logical operations are executed using the background threshold pattern, the latent-image threshold pattern, a copy-forgery-inhibited pattern basic image as a binary image that designates the latent-image part and background-image part, and a camouflage region designation image as a binary image that designates a camouflage region, thereby generating a copy-forgery-inhibited pattern image at high speed using a small memory size.

Note that the background threshold pattern and latent-image threshold pattern are parameters that determine the densities of the background-image part and latent-image part of a copy-forgery-inhibited pattern image upon printing, and are practical elements of "copy-forgery-inhibited pattern density parameters".

Since a copy-forgery-inhibited pattern image is generated by executing logical operations for determining ON/OFF of dots of the copy-forgery-inhibited pattern image for each pixel, the memory size required to generate the copy-forgery-inhibited pattern image is greatly reduced.

FIG. 1 is a block diagram showing the internal process of a copy-forgery-inhibited pattern compositing/printing apparatus of the first embodiment. This copy-forgery-inhibited pattern compositing/printing apparatus comprises a copy-forgery-inhibited pattern image generation unit 101, composition unit 102, print data processing unit 103, and print unit 104. In this embodiment, the copy-forgery-inhibited pattern compositing/printing apparatus will be explained as a device including the aforementioned units. However, the present invention is not limited to such specific arrangement. For example, the copy-forgery-inhibited pattern compositing/printing apparatus may be configured as a system in which the copy-forgery-inhibited pattern image generation unit 101, composition unit 102, and print data processing unit 103 are implemented by a single device such as a computer or the like, and a printing device which can communicate with this computer has the print unit 104.

The copy-forgery-inhibited pattern image generation unit 101 receives an input background-image 112, color information 111, processing region information 113, latent-image threshold pattern 114, background threshold pattern 116, copy-forgery-inhibited pattern basic image 115, and camouflage region designation image 117, and generates and outputs a copy-forgery-inhibited pattern image 118. The copy-forgery-inhibited pattern image generation unit 101 generates the copy-forgery-inhibited pattern image 118 by applying image processes to the input background image 112 according to predetermined rules. Note that the input background image 112 can be either a multi-valued image or binary image. The processing region information 113 indicates a region which is to undergo a copy-forgery-inhibited pattern embedding process in input image information.

The copy-forgery-inhibited pattern basic image 115 is used to designate minimum elements including the latent-image part and background-image part, and is made up of 1 bit per pixel. One bit (e.g., 1) of the copy-forgery-inhibited pattern basic image 115 designates the latent-image part, and the other bit (e.g., 0) designates the background-image part. The camouflage region designation image 117 is used to designate a region where a lower density is to be set so as to provide a camouflage effect, and is made up of 1 bit per pixel as in the copy-forgery-inhibited pattern basic image 115. One bit (e.g., 1) of the camouflage region designation image 117 designates a non-camouflage region, and the other bit (e.g., 0) designates a camouflage region where a lower density is to be set compared to the surrounding portion.

Figure 10:
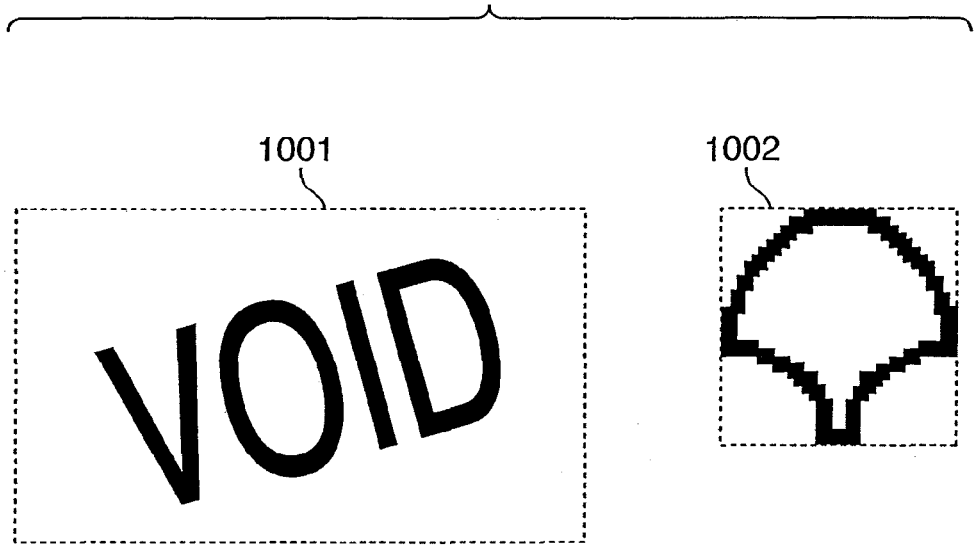
FIG. 10 show examples of a copy-forgery-inhibited pattern basic image 115 and camouflage region designation image 117.

FIG. 10 shows examples of the copy-forgery-inhibited pattern basic image 115 and camouflage region designation image 117. Referring to FIG. 10, reference numeral 1001 denotes an example of the copy-forgery-inhibited pattern basic image 115. Reference numeral 1002 denotes an example of the camouflage region designation image 117.

As has already been described above, the background threshold pattern 116 and latent-image threshold pattern 114 are generated by applying threshold processes using the threshold values of the background and latent-image dither matrices to appropriate image signals, so that these patterns are to be output to have an equal density when they are printed out.

Figure 11:
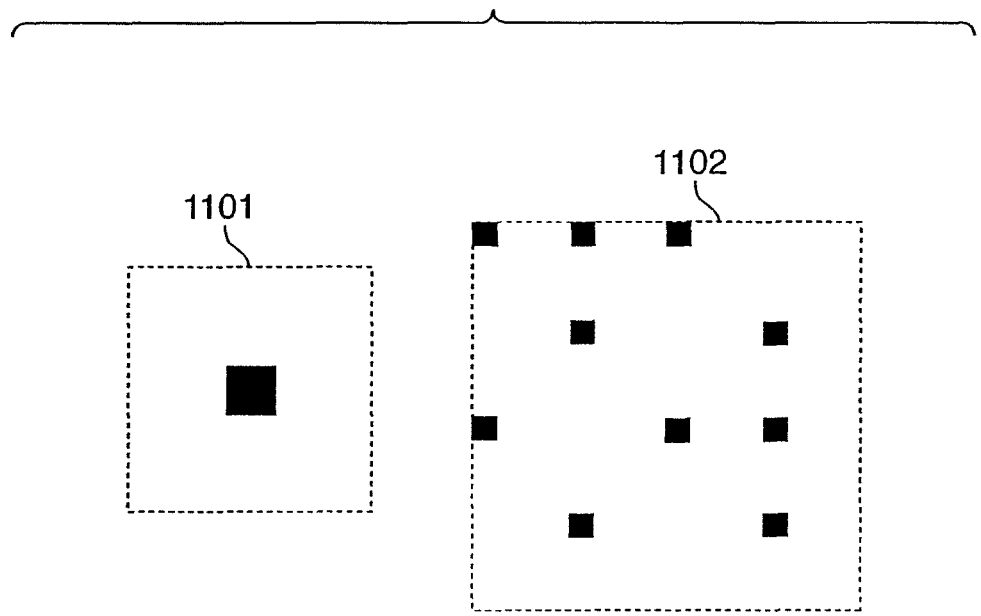
FIG. 11 shows examples of a latent-image threshold pattern 114 and background threshold pattern 116.

FIG. 11 shows examples of the latent-image threshold pattern 114 and background threshold pattern 116. Referring to FIG. 11, reference numeral 1101 denotes a latent-image threshold pattern; and 1102, a background threshold pattern.

The copy-forgery-inhibited pattern image 118 generated by the copy-forgery-inhibited pattern image generation unit 101 is output to the composition unit 102. The generation method of the copy-forgery-inhibited pattern image 118 will be described in detail later.

The composition unit 102 generates a copy-forgery-inhibited pattern composited output document image by compositing the input document image 119 and the generated copy-forgery-inhibited pattern image 118. When the copy-forgery-inhibited pattern image 118 is directly output as a copy-forgery-inhibited pattern composited output document image irrespective of the contents of the input document image 119, the composition unit 102 need not refer to the input document image 119. At this time, the copy-forgery-inhibited pattern image 118 and objects which form the input document image 119 may undergo a color matching process, and the objects which form the input document image 119 may be composited to the copy-forgery-inhibited pattern image 118 to generate the copy-forgery-inhibited pattern composited output document image. Alternatively, the next print data processing unit 103 may apply a color matching process to the copy-forgery-inhibited pattern composited output document image.

The print data processing unit 103 receives the copy-forgery-inhibited pattern composited output document image composited by the composition unit 102 as rendering information via a rendering interface of an OS (operating system) (e.g., Graphic Device Interface (GDI) of Windows® series of Microsoft Corporation, QuickDraw of MacOS series as an OS of Apple Computer, Inc., and the like are well known), and sequentially converts it into a print command. At this time, image processes such as a color matching process, RGB-CMYK conversion, halftone process, and the like are executed as needed. The print data processing unit 103 sends, as the copy-forgery-inhibited pattern composited output document image data, a data format that can be interpreted by the print unit 104 (e.g., a data format described in a page description language, or a data format rasterized to a print bitmap) to the next print unit 104.

The print unit 104 prints out a copy-forgery-inhibited pattern composited output document image in accordance with information of the input copy-forgery-inhibited pattern composited output document image data. A laser beam printer will be exemplified below. The print unit 104 comprises a printer controller and printer engine (not shown). This printer controller comprises a print information control unit, page memory, output control unit, and the like. The print information control unit interprets a page description language (PDL) sent from the print data processing unit 103, and rasterizes patterns corresponding to rendering and printing commands on the page memory.

In this case, image processes such as RGB-CMYK conversion, a halftone process, and the like are executed as needed. When a print bitmap is determined in place of the data format described in the page description language, image data is directly rasterized on the page memory.

The output control unit converts the contents of the page memory into a video signal, and outputs it to the printer engine. This printer engine comprises, e.g., a print medium convey mechanism, semiconductor laser unit, photosensitive drum, developing unit, fixing unit, drum cleaning unit, separation unit, and the like, and prints using a known electrophotography process.

When the copy-forgery-inhibited pattern image generation unit 101 generates a copy-forgery-inhibited pattern image which is designed to output respective pixels using only a primary color (cyan, yellow, magenta, or black) of the printer, it is not desirable that respective pixels which are expressed to be output using the primary color (cyan, yellow, magenta, or black) of the printer are printed using a plurality of different colors of inks or toners. Therefore, the print data processing unit 103 and print unit 104 are preferably set not to simultaneously express pixel values (e.g., cyan, magenta, yellow, or black) corresponding to the copy-forgery-inhibited pattern image in the copy-forgery-inhibited pattern composited output document image using a plurality of different colors of inks or toners, i.e., a mixed color.

More specifically, a setup that prints a copy-forgery-inhibited pattern image always using a monochrome ink or toner even after a color conversion process such as color matching or the like is skipped and a halftone process is executed is preferably introduced. However, this is not the case when one pixel of the copy-forgery-inhibited pattern image is expressed by light and dark inks or large and small ink dots of an identical color by an ink-jet printer. As color variations of a copy-forgery-inhibited pattern image, a copy-forgery-inhibited pattern image which looks green may be generated by laying out cyan and yellow pixels in a balanced manner. In this case as well, if one pixel of the copy-forgery-inhibited pattern image is formed of the primary color (cyan, yellow, magenta, or black) of the printer, it is preferably accurately output using only a corresponding cyan or yellow toner or ink.

However, an image that can implement a copy-forgery-inhibited pattern effect can be generated without printing out one pixel of the copy-forgery-inhibited pattern image using only the primary color (cyan, yellow, magenta, or black) of the printer. Even when one pixel of the copy-forgery-inhibited pattern image is expressed by a plurality of different colors of inks or toners, such copy-forgery-inhibited pattern image can be used as a copy-forgery-inhibited pattern as long as a latent-image remains after copying.

In this embodiment, assume that all of the copy-forgery-inhibited pattern image, input document image, copy-forgery-inhibited pattern composited output document image, and copy-forgery-inhibited pattern composited output document image data are digital data, and a copy-forgery-inhibited pattern composited output document represents an image printed on a paper sheet.

The internal process of a copy-forgery-inhibited pattern generation apparatus will be described below using FIG. 2.

Figure 2:
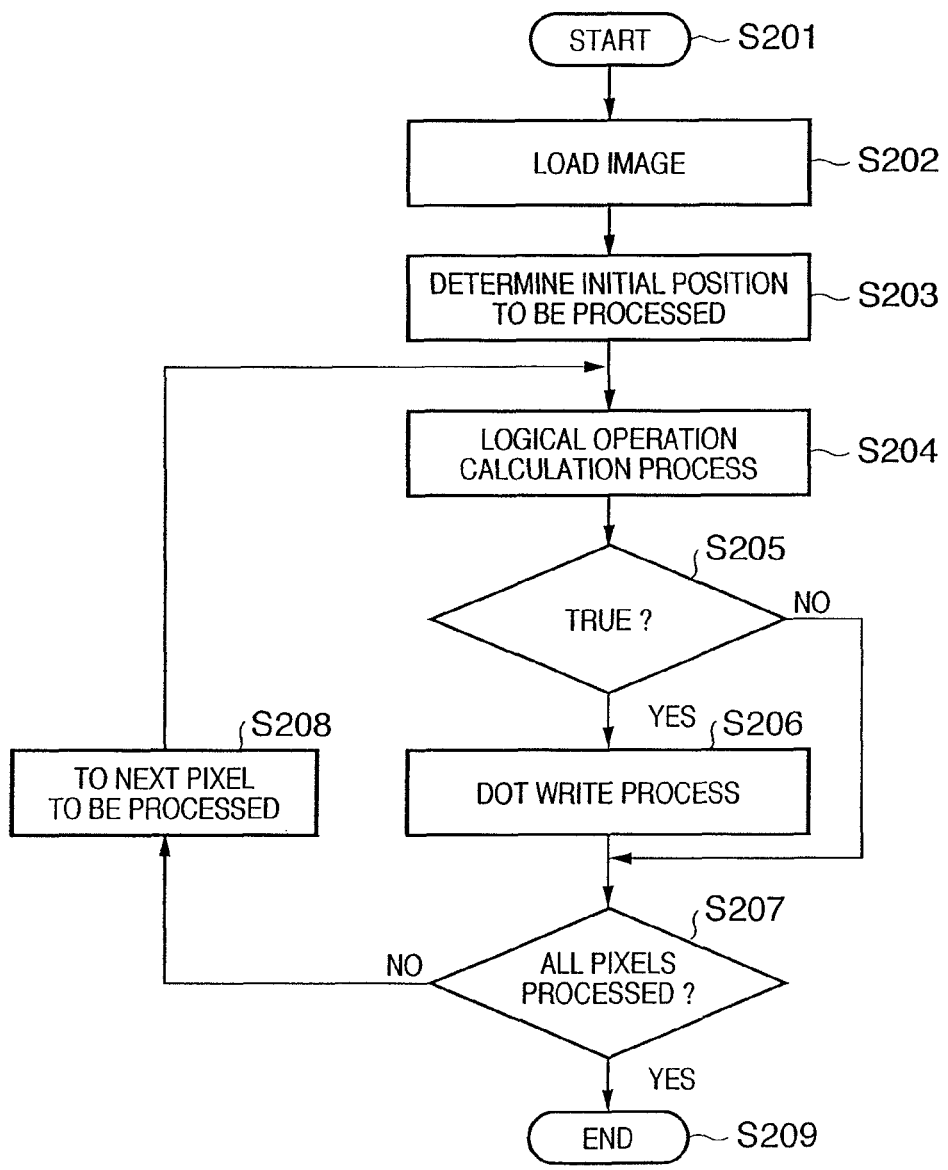
FIG. 2 is a flowchart showing the internal processing sequence of a copy-forgery-inhibited pattern image generation unit 101 in the first embodiment.

FIG. 2 is a flowchart showing the internal processing sequence of the copy-forgery-inhibited pattern image generation unit 101 in the first embodiment. In step S201, a copy-forgery-inhibited pattern image generation process starts via a user interface or the like. In step S202, the input background image 112, background threshold pattern 116, latent-image threshold pattern 114, copy-forgery-inhibited pattern basic image 115, and camouflage region designation image 117 are loaded.

In step S203, an initial pixel upon generation of a copy-forgery-inhibited pattern image is determined. For example, when the entire input image undergoes an image process in the raster scan order from the upper left position to the lower right position to be converted into a copy-forgery-inhibited pattern image, the upper left position is set as an initial position.

In step S204, the background threshold pattern 116, latent-image threshold pattern 114, copy-forgery-inhibited pattern basic image 115, and camouflage region designation image 117 are to be laid out in a tile pattern from the upper left position, and equation (1) given by:

$$nWriteDotOn = nCamouflage \times \quad (1)$$
$$(nSmallDotOn \times \overline{nHiddenMark} + nLargeDotOn \times nHiddenMark)$$

where nCamouflage: 0 if a pixel of interest in the camouflage region designation image is a pixel which forms a camouflage pattern; otherwise, 1 nSmallDotOn: 1 if the pixel value of the background threshold pattern is black; 0 if it is white (the colors are not limited to these specific colors)

nLargeDotOn: 1 if a pixel value of the latent-image threshold pattern is black; 0 if it is white (the colors are not limited to these specific colors)

nHiddenMark: 1 if a pixel of interest in the copy-forgery-inhibited pattern basic image is a pixel which forms a latent image; 0 if it is a pixel that forms a background image /nHiddenMark: NOT of nHiddenMark. It assumes 0 for the latent-image part; 1 for the background-image part.

is calculated for a pixel to be processed of the input background image 112 to check if a corresponding pixel value is to be written in a dot upon printing. At this time, a pixel value corresponds to the input color information 111.

Note that whether or not a corresponding pixel value is to be written in a dot upon printing may be determined with reference to the pixel value of the input background image at that time. In this case, a term (nBackground) obtained with reference to the input background image may be multiplied by the right-handed side of equation (1). This nBackground assumes 1 if the input background image corresponds to a region (white region) having a specific value; otherwise, it assumes 0.

For each pixel to be processed, a calculation need not be made using all elements of equation (1). The processing can be speeded up by omitting unnecessary calculations as follows.

For example, if nHiddenMark=1, /nHiddenMark=0; if nHiddenMark=0, /nHiddenMark=1. Therefore, if nHiddenMark=1, a value given by:

$$(nSmallDotOn \times \overline{nHiddenMark + nLargeDotOn \times nHiddenMark}) \quad (2)$$

may be used as the value of nLargeDotOn, if nHiddenMark=0, a value given by equation (2) may be used as the value of nSmallDotOn.

Also, the value of nCamouflage is multiplied by the result of all other values in parentheses, and if nCamouflage=0, nWriteDotOn=0. Therefore, if nCamouflage=0, a calculation of equation (2) after nCamouflage can be omitted.

Since an image, which has a height and width equal to least common multiples of those of the background threshold pattern 116, latent-image threshold pattern 114, copy-forgery-inhibited pattern basic image 115, and camouflage region designation image 117, becomes a minimum unit of repetition in the copy-forgery-inhibited pattern image to be generated, the copy-forgery-inhibited pattern image generation unit 101 generates only a portion of the copy-forgery-inhibited pattern image as the minimum unit of repetition, and repetitively arranges that portion of the copy-forgery-inhibited pattern image in a tile pattern to match the size of the input background image, thus shortening the processing time required to generate the copy-forgery-inhibited pattern image 118.

In step S205, the calculation result (the value of nWriteDotOn) in step S204 is checked. If nWriteDotOn=1, the flow advances to step S206; if nWriteDotOn=0, the flow advances to step S207.

In step S206, a process for writing a corresponding pixel value in a dot upon printing is executed. The pixel value can be changed depending on the color of the copy-forgery-inhibited pattern image 118. When a black copy-forgery-inhibited pattern is to be generated, the pixel to be processed of the input background image 112 is set to be black. In addition, if cyan, magenta, or yellow is set in correspondence with the toner or ink color of the printer, a color copy-forgery-inhibited pattern image 118 can be generated.

If the input background image 112 is image data which is formed of one to several bits per pixel, an index color can be used to express a pixel value. The index color is an expression method of image data. That is, each color information that frequently appears in a target color image is set as an index (for example index 0=white, index 1=cyan, and the like), and each pixel value is expressed by the number of the index that describes the color information (for example, the first pixel value is the value of index 1, the second pixel value is the value of index 2, . . . ).

It is checked in step S207 if all the pixels of the region to be processed of the input background image 112 have been processed. If all the pixels of the region to be processed of the input background image 112 have been not processed yet, the flow advances to step S208 to select the next pixel to be processed, and the processes in steps S204 to S206 are repeated. If all the pixels of the region to be processed of the input background image 112 have been processed, the flow advances to step S209 to end the image process in the copy-forgery-inhibited pattern image generation unit 101. With the above process, the copy-forgery-inhibited pattern image 118 can be generated by applying the image process to the input background image.

A dot layout method in the latent-image part and background-image part in this embodiment will be described below. This embodiment will explain a case wherein the latent-image part is generated based on the dot-concentration dither matrix, and the background-image part is generated based on the dot-scattering dither matrix. As a typical dot-concentration dither matrix used to generate the latent-image part, a spiral dither matrix is prevalent.

Figure 3:
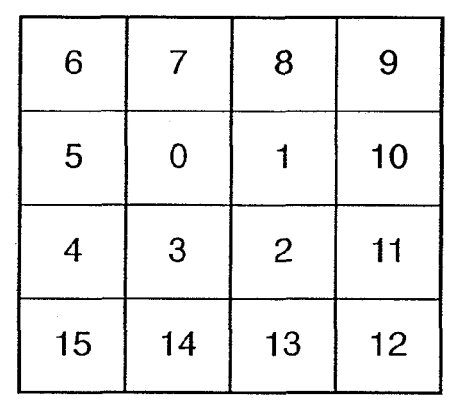

FIG. 3 shows an example of a 4×4 spiral dither matrix. Threshold values of the 4×4 spiral dither matrix are laid out in a spiral pattern so that their numerical values increase in turn from the center.

Figure 4:
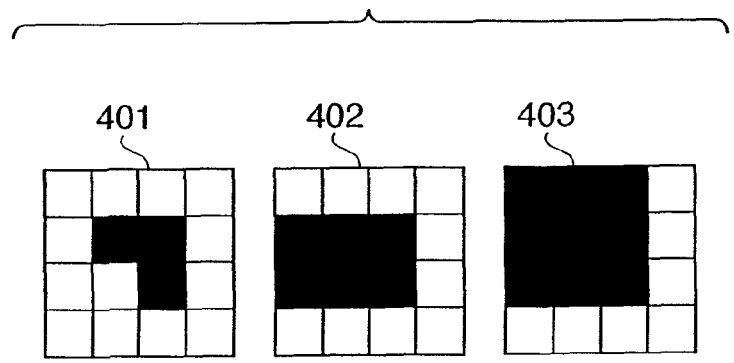
FIG. 4 shows threshold patterns (dot layouts) obtained by applying a threshold process to predetermined input image signals using the 4×4 screw dither matrix shown in FIG. 3.

FIG. 4 shows threshold patterns (dot layouts) obtained by applying a threshold process to predetermined input image signals using the 4×4 spiral dither matrix shown in FIG. 3. Referring to FIG. 4, reference numerals 401, 402, and 403 respectively denote threshold patterns obtained by applying a threshold process to input image signals 3, 6, and 9 using the dither matrix in FIG. 3. In each of the threshold patterns (dot layouts) obtained in this case, dots are laid out to be concentrated.

On the other hand, as a typical dot-scattering dither matrix used to form the background-image part, a Bayer dither matrix is prevalent. A Bayer N×N dither matrix is given by:

$$D_N = \begin{bmatrix} 4D_{N/2} & 4D_{N/2} + 2U_{N/2} \\ 4D_{N/2} + 3U_{N/2} & 4D_{N/2} + U_{N/2} \end{bmatrix}$$

where N is the power of 2, and $U_N$ is an N×N matrix, each element of which is 1.

Figure 5:
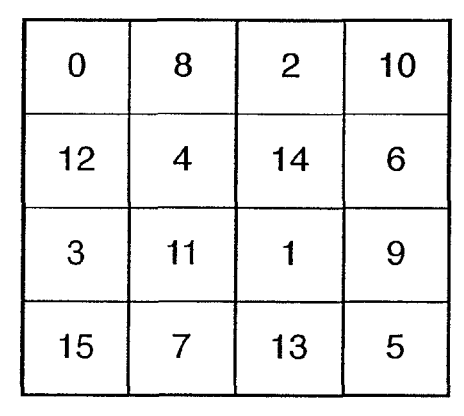

FIG. 5 shows an example of a 4×4 Bayer dither matrix. A threshold pattern generated by applying dithering to an arbitrary input image signal using the Bayer dither matrix is designed to scatter respective dots.

Figure 6:
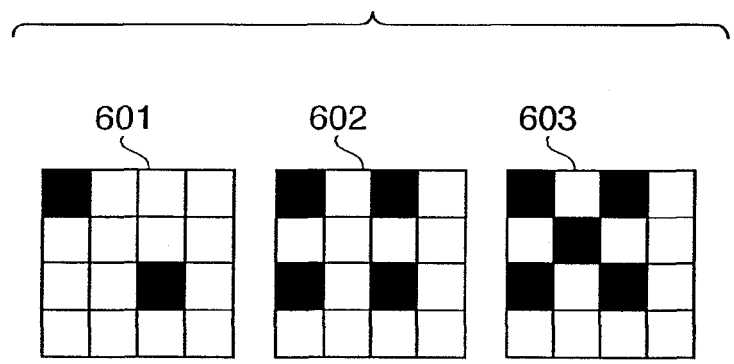
FIG. 6 shows threshold patterns (dot layouts) obtained by applying a threshold process to predetermined input image signals using the 4×4 Bayer dither matrix shown in FIG. 5.

FIG. 6 shows threshold patterns (dot layouts) obtained by applying a threshold process to predetermined input image signals using the 4×4 Bayer dither matrix shown in FIG. 5. Referring to FIG. 6, reference numerals 601, 602, and 603 respectively denote threshold patterns obtained by applying a threshold process to input image signals 2, 4, and 5 using the dither matrix in FIG. 5. In each of the threshold patterns (dot layouts) obtained in this case, dots are laid out to be scattered. In the Bayer dither matrix, respective elements of a threshold matrix are laid out in turn at positions where they do not contact each other if possible, and threshold patterns have lattice-like dot layouts. In Bayer dithering, periodic texture often stands out due to a matrix with increasing dither matrix size, but a periodic fine pattern is obtained at a specific gray level as a merit.

In this embodiment, a case will be mainly explained wherein the Bayer dither matrix is used as that used for the background. However, the present invention is not limited to the Bayer dither matrix. Other dot-scattering dither matrices may be used.

For example, a blue noise mask is an example of dot-scattering dither matrices used for background. With this blue noise mask, all threshold patterns at an arbitrary gray level have blue noise characteristics, and the distribution of black pixels which form each threshold pattern is random but has high uniformity, thus obscuring granularity. The blue noise characteristics mean that an output pattern of dots upon setting an arbitrary gray level is locally aperiodic and isotropic, and has a small number of low-frequency components. A threshold pattern generated using the blue noise mask can obtain a visually preferable output pattern: generation of moiré is prevented, paper feed nonuniformity is obscured, and so forth.

In place of the blue noise mask, a dot-scattering dither matrix that can form a threshold pattern at a specific or arbitrary gray level, which is periodic (or pseudo-periodic) and anisotropic and has a small number of low-frequency components may be used. In this embodiment, the background-image part may be formed using error diffusion although it is not a method using a threshold pattern. When a background threshold pattern is generated using the aforementioned Bayer dither matrix or blue noise mask, the value of nSmallDotOn in equation (1) can be read out with reference to the background threshold pattern. On the other hand, when error diffusion is used, the sum of a gray level corresponding to a background density and errors distributed from surrounding pixels is compared with a predetermined threshold value for each pixel to determine ON/OFF of dots in a pixel to be processed, and the value determined in this case may be used as that of nSmallDotOn. At this time, errors generated upon ON/OFF of dots are distributed to neighboring pixels after they are weighted. The pixel value of a pixel to be processed is the sum of an original input pixel value corresponding to the background density and the distributed error.

Assume that gray levels corresponding to background densities are prepared in advance as in the background threshold pattern. Error diffusion requires a long processing time as its demerit, but can obtain an image with good visual characteristics in which dots are uniformly scattered as its merit. Since error diffusion is already well known, a detailed description thereof will be omitted in this embodiment. Likewise, a method obtained by improving error diffusion can be applied.

Also, threshold patterns corresponding to respective gray levels need not be generated based on a dither matrix. A background threshold pattern and latent-image threshold pattern may be independently generated for each gray level. In this case, threshold patterns with high image quality can be corrected for respective gray levels, as a merit.

FIG. 7 is a view for comparing the area ratios of the background threshold pattern and latent-image threshold pattern. As shown in FIG. 7, let X_S and Y_S be the height and width of the background dither matrix, T_S be the gray level of an input image signal, X_L and Y_L be the height and width of the latent-image dither matrix, and T_L be the gray level of an input image signal.

Then, the occupation ratio of black pixels in the background threshold pattern is given by P_S=T_S/(X_S*Y_S), and that of black pixels in the latent-image threshold pattern is given by P_L=T_L/(X_L*Y_L).

Figure 8:
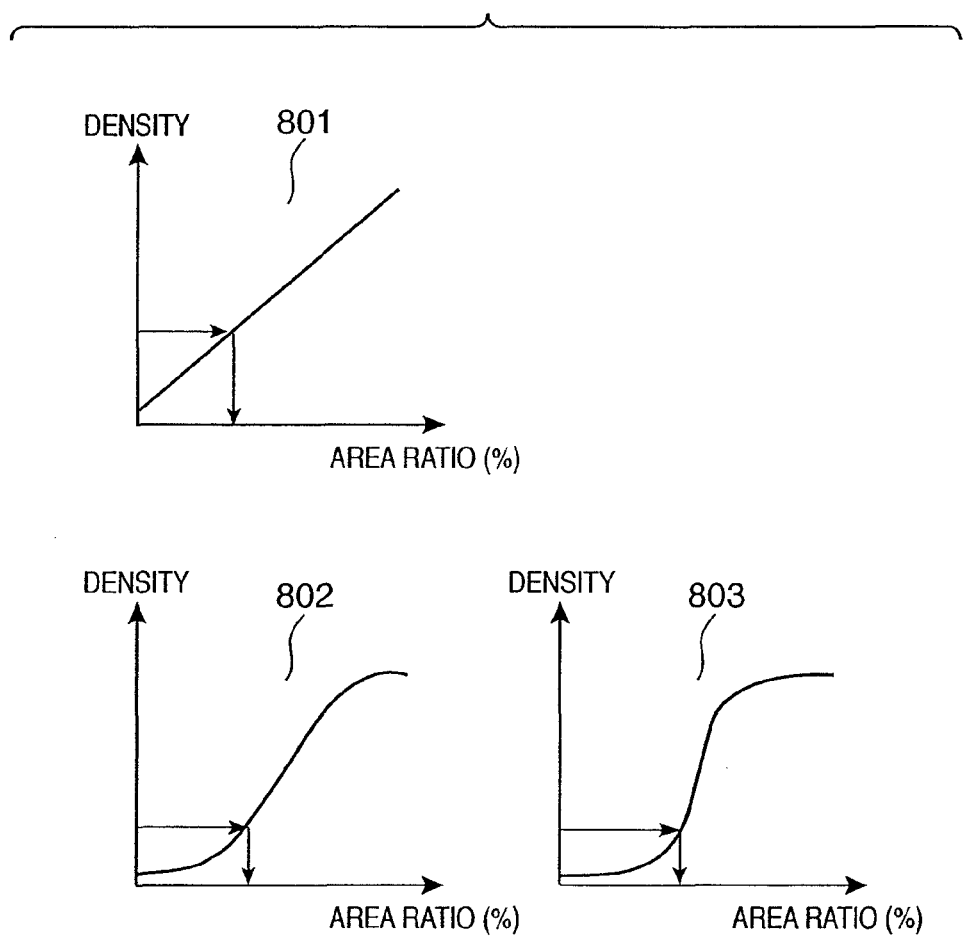
FIG. 8 shows graphs showing the relationships between the area ratios of black pixels of threshold patterns obtained by applying a threshold process to input image signals using a dither matrix, and the densities upon printing the threshold patterns.

FIG. 8 show graphs showing the relationships between the area ratios of black pixels of threshold patterns obtained by applying a threshold process to input image signals using a dither matrix, and the densities upon printing the threshold patterns. In dithering, since the area ratio of black pixels changes depending on the gray levels of input image signals, the abscissa of FIG. 8 may be considered as the gray levels of input image signals.

Note that the dither matrix of the background-image part (background threshold pattern) and the dither matrix of the latent-image part (latent-image threshold pattern) need not always have the same side size, but they may have different sizes. For example, when the background dither matrix and latent-image dither matrix have identical grayscale characteristics (e.g., 801), if the values on the abscissa (the area ratios of black pixels) are nearly equal to each other irrespective of the sizes of the dither matrices of the background-image part and latent-image part, i.e., if the gray levels T_S and T_L of input image signals that make P_S and P_L nearly equal to each other are used, the background threshold pattern and latent-image threshold pattern have nearly equal densities, and a copy-forgery-inhibited pattern image that can obscure a latent-image can be generated.

However, in practice, the background and latent-image dither matrices do not always have identical grayscale characteristics depending on the characteristics of a printer.

For example, assume that the grayscale characteristics of the latent-image dither matrix are expressed by a moderate S curve (e.g., 802), and those of the background dither matrix are expressed by a steep S curve (e.g., 803). In such case, even when the area ratios of black pixels of the background and latent-image threshold patterns are set to be nearly equal to each other, the densities of the background-image and latent-image parts do not become equal to each other upon printing.

By appropriately adjusting one of the background-image and latent-image parts or input image signals to both the dither matrices, the density of one of the background-image and latent-image parts can be approximate to that of the other upon printing.

If the number of gray levels that can be expressed by the background or latent-image dither matrix is large, the density of the background or latent-image part can be finely adjusted by adjusting the gray level of an input image signal.

When the latent-image dither matrix is the dot-concentration dither matrix, as shown in FIG. 3, and when the gray level of an input image signal becomes equal to or lower than a given value, isolated dots are formed, and the latent-image part is prone to disappear. On the other hand, when the gray level of an input image signal becomes equal to or higher than a given value, dots are concentrated, and groups of dots themselves that form the latent-image are clearly visually recognized.

Therefore, in the latent-image dither matrix, the gray levels of possible input image signals preferably fall within a predetermined range. In the latent-image dither matrix shown in FIG. 3, even when the dither matrix size changes, if the gray level of an input image signal remains the same, nearly identical concentrated dot layouts can be obtained. Therefore, by maintaining constant the gray level of an input image signal to the latent-image dither matrix, and changing the dither matrix size, the density per unit area can be changed.

On the other hand, when the background dither matrix is the dot-scattering dither matrix, shown in FIG. 8, the density can be changed by changing the gray level of an input image signal while uniformly printing dots on the entire image. Therefore, the background dither matrix having a broader grayscale range (i.e., a larger dither matrix size) excels in density adjustment of the background-image part.

When a copy-forgery-inhibited pattern is to be output using a printer, an adjustment function of adjusting the density variations of the printer is required. Such function will be described in detail later.

FIG. 9 is a view showing the generation process of a copy-forgery-inhibited pattern image using the copy-forgery-inhibited pattern compositing/printing apparatus shown in FIG. 1. Referring to FIG. 9, reference numerals 901, 902, and 903 respectively denote a latent-image threshold pattern, background threshold pattern, and copy-forgery-inhibited pattern basic image; and 904, a copy-forgery-inhibited pattern image generated based on equation (1). Note that no camouflage pattern is introduced in the generation stage of the image 904.

In the copy-forgery-inhibited pattern image 904 shown in FIG. 9, a group of dots as a combination of the latent-image and background threshold patterns is generated at a boundary portion of the latent-image and background in the copy-forgery-inhibited pattern basic image 903, as indicated by a circled region 910. Such group of dots is readily generated when the boundary between the latent-image and background of the copy-forgery-inhibited pattern basic image 903 is not synchronized with the size of the latent-image threshold pattern. Also, since such groups of dots concentratedly appear at the boundary between the latent-image and background of the copy-forgery-inhibited pattern basic image, an approximate shape of the latent-image stands out, thus reducing the effect of the copy-forgery-inhibited pattern as a demerit.

Therefore, in order to generate a copy-forgery-inhibited pattern image with high image quality, a process that prevents groups of dots from being generated at the boundary between the latent-image and background in the copy-forgery-inhibited pattern basic image is required.

In this embodiment, the process that prevents groups of dots from being generated at the boundary between the latent-image and background in the copy-forgery-inhibited pattern basic image will be referred to as a "boundary process" hereinafter. As an example of this boundary process, a method of reading only the pixel values of the repetitively laid-out copy-forgery-inhibited pattern basic images, which correspond to the centers of repetitively laid out latent-image threshold patterns (a pixel which is moved from the upper left position by those which are obtained by omitting the half of one side of each latent-image threshold pattern is used as the center) to set values of HiddenMarkLattice, and processing pixels which belong to one latent-image threshold pattern using identical values of HiddenMarkLattice is available. This processing method is described by:

$$nWriteDotOn = nCamouflage \times (nSmallDotOn \times nHiddenMarkLattice + nLargeDotOn \times nHiddenMarkLattice)$$

Using this method, each latent-image threshold pattern is formed together with a white background unless it is located at the end of an image. Therefore, when the white background is present around black pixels of the latent-image threshold pattern, it serves as a buffer zone to prevent black pixels of the latent-image and background threshold patterns from contacting, and the boundary between the latent-image and background designated by the copy-forgery-inhibited pattern basic image can be prevented from standing out.

In FIG. 9, reference numeral 905 denotes a copy-forgery-inhibited pattern image that has undergone the boundary process. As can be seen from the image 905, no groups of dots as combinations of the latent-image and background threshold patterns are generated at the boundary between the latent-image and background designated by the copy-forgery-inhibited pattern basic image.

As an example of another boundary process, a method of pre-processing the boundary between the latent-image and background in the input copy-forgery-inhibited pattern basic image in synchronism with the size of each latent-image threshold pattern is available. With this method, latent-image threshold patterns are repetitively laid out in the copy-forgery-inhibited pattern basic image, and the pixel values of the copy-forgery-inhibited pattern basic image, corresponding to the centers of the latent-image threshold patterns, are read, thus generating a sub-sampled copy-forgery-inhibited pattern basic image. The sub-sampled copy-forgery-inhibited pattern basic image is enlarged, so that the size of one pixel becomes an integer multiple of that of the latent-image threshold pattern, thereby preparing a modified copy-forgery-inhibited pattern basic image. Finally, a copy-forgery-inhibited pattern image is generated based on equation (1) with respect to the modified copy-forgery-inhibited pattern basic image, thus generating a copy-forgery-inhibited pattern image free from any groups of dots indicated by 910.

When the aforementioned "boundary process" is added to the copy-forgery-inhibited pattern image generation unit 101, the copy-forgery-inhibited pattern basic image need not be prepared by synchronizing the boundary between the latent-image and background designated by the copy-forgery-inhibited pattern basic image with the size of each latent-image threshold pattern, resulting high usability for the user.

Figure 12A:
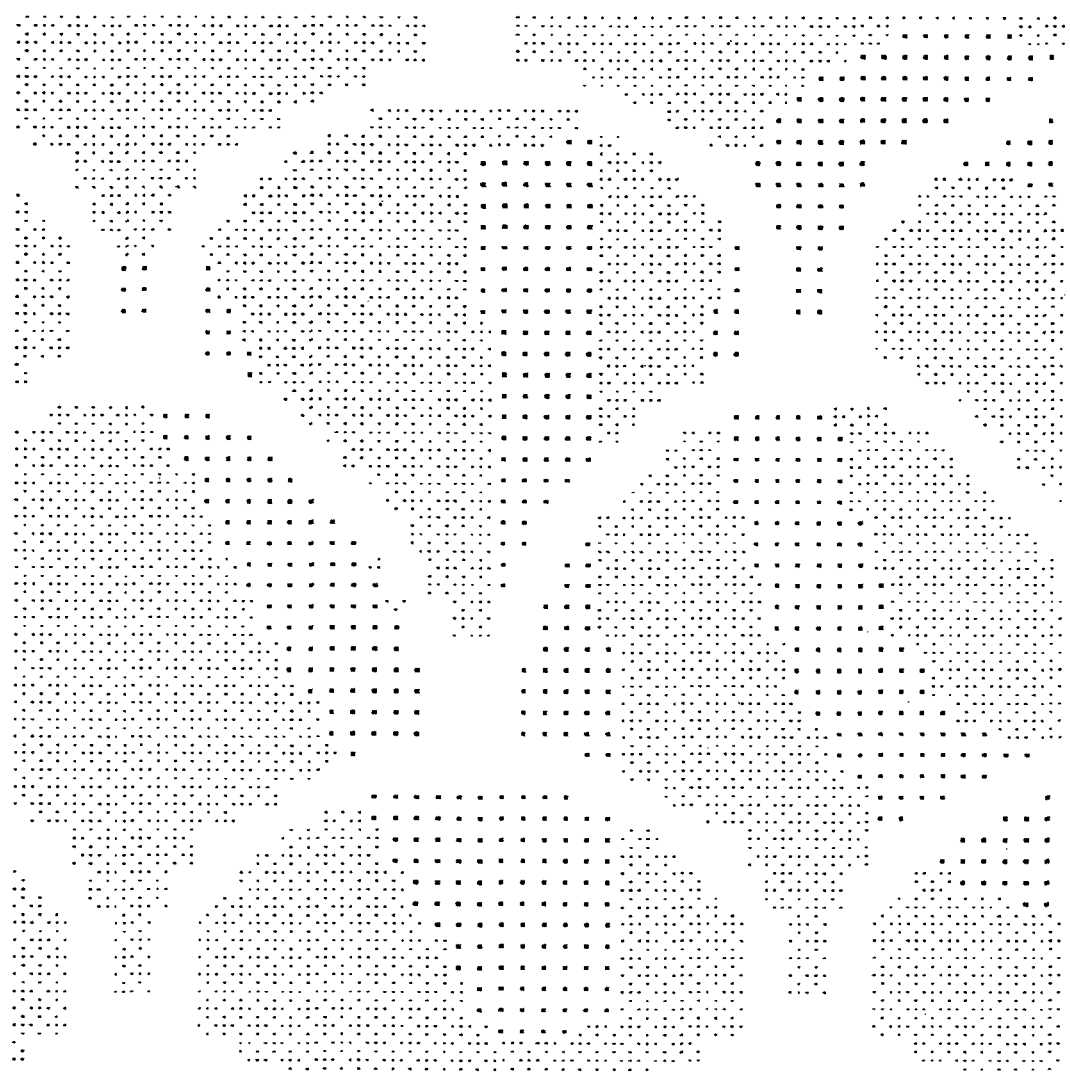
FIG. 12A partially shows a copy-forgery-inhibited pattern image generated by the copy-forgery-inhibited pattern image generation unit 101 by a boundary process.

FIG. 12A partially shows a copy-forgery-inhibited pattern image generated by the copy-forgery-inhibited pattern image generation unit 101 by the boundary process. Upon generating the copy-forgery-inhibited pattern image shown in FIG. 12A, the images 1001 and 1002 shown in FIG. 10 are respectively used as the copy-forgery-inhibited pattern basic image and camouflage region designation image, and the images 1101 and 1102 shown in FIG. 11 are respectively used as the latent-image threshold pattern and background threshold pattern. Note that the broken lines which bound the images 1001, 1002, 1101, and 1102 indicate the image boundaries, which are not present in an actual image. Since the copy-forgery-inhibited pattern image shown in FIG. 12A has undergone the boundary process, the boundary between the latent-image and background does not suffer any dot grouping phenomenon, and the latent-image part becomes harder to recognize.

[Large/small Dot Checkered Pattern Layout]

In the following description, the method of repetitively laying out the aforementioned latent-image threshold patterns in a tile pattern will be referred to as a "tile layout of latent-image threshold patterns in the latent-image part" or simply as a "tile layout".

Note that a "checkered pattern" in the present invention indicates a pattern in which regions having predetermined shapes alternately and repetitively appear, and is an expression including a lattice pattern and the like. That is, layouts and shapes are not particularly limited as long as different images are laid out in a tile pattern at predetermined intervals.

The layout method of latent-image threshold patterns will be described in detail below.

In general, it is known that the two-dimensional spatial frequency characteristics of human vision have dependence in the spatial direction, and the visual resolution drops with respect to a pattern in which dots are laid out at an angle of 45°. Also, in halftone dot printing, it is a common practice to lay out K (black) dots which are normally most conspicuous at an angle of 45° (a screen angle of 45°).

Therefore, in the copy-forgery-inhibited pattern image as well, latent-image threshold patterns (large dots) of the latent-image part are laid out to be approximate to a halftone dot screen at a screen angle of 45°, thus more obscuring the latent-image part.

In this embodiment, by laying out latent-image threshold patterns (large dots) in a checkered pattern, a layout approximate to a halftone dot screen at a screen angle of 45° can be realized.

Initially, a flag nChecker used to divide the latent-image part into two regions (a region where large dots are written and a region where no large dots are written) is prepared. Note that the flag nChecker is set at a predetermined value (0 or 1) at the upper left position of an image or the embedding start position of a copy-forgery-inhibited pattern image. Next, every time the dot write region shifts to a right-neighboring or lower-neighboring latent-image threshold pattern, the value of the flag nChecker is inverted from the previous value. That is, if the previous value is 0, it is inverted to 1; and vice versa.

When the value of the flag nChecker is changed in this way, a checkered pattern in which 0 and 1 are switched for respective repetition units of the latent-image threshold patterns can be generated.

The latent-image threshold patterns (large dots) are written only when the copy-forgery-inhibited pattern basic image indicates the latent-image part (nHiddenMarkLattice=1) and the flag nChecker that defines the checkered pattern is 1. This process can be described as a logical operation by:

$$nWriteDotOn = nCamouflage \times (nSmallDotOn \times \overline{nHiddenMarkLattice} + nLargeDotOn \times (nHiddenMarkLattice \times nChecker))$$

Figure 12B:
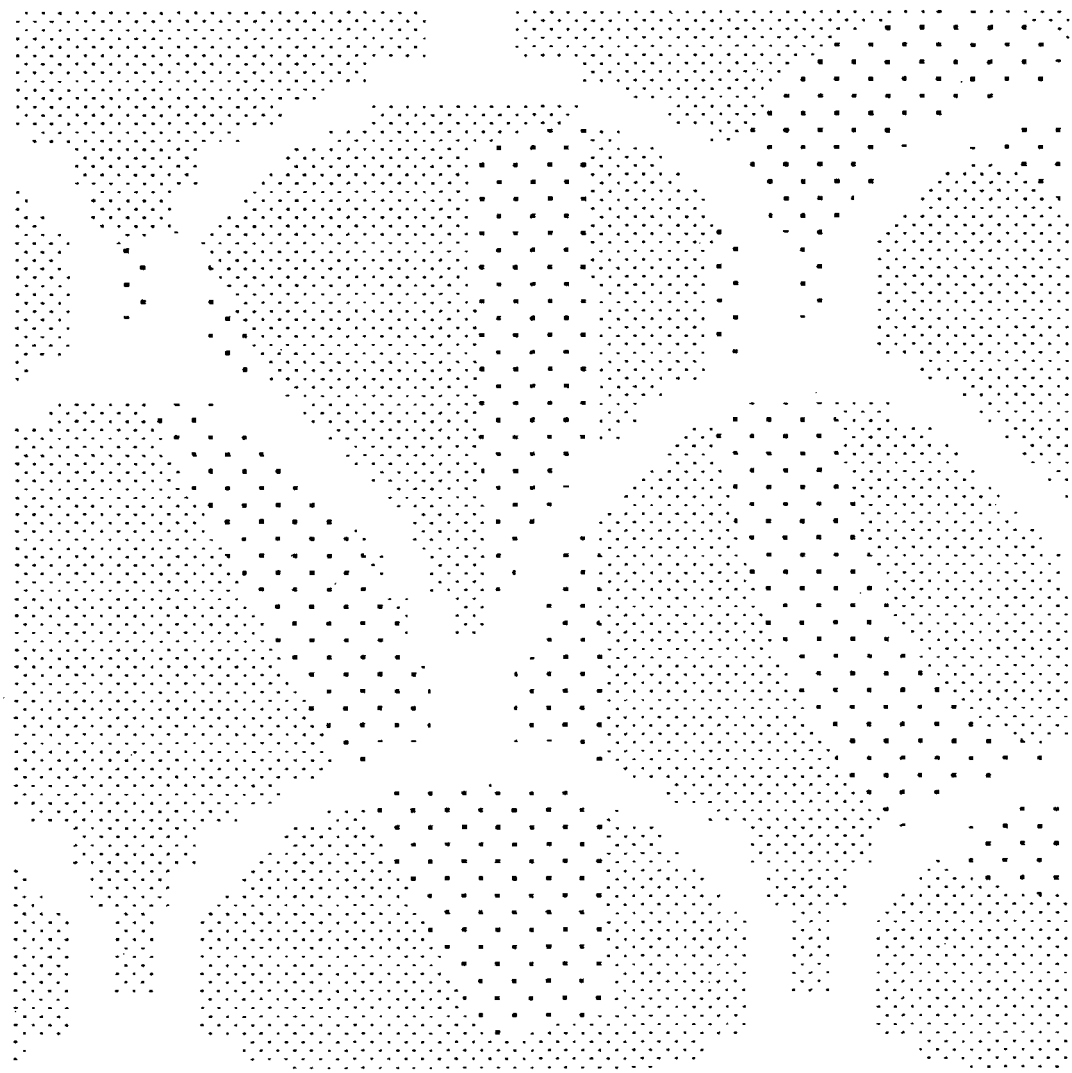
FIG. 12B shows an example of a copy-forgery-inhibited pattern image with a checkered pattern layout.

FIG. 12B shows an example of a copy-forgery-inhibited pattern image with the checkered pattern layout, which is generated by controlling ON/OFF of dots on the basis of the aforementioned logical expression. In FIG. 12B, latent-image threshold patterns are laid out in the checkered pattern, and the spatial frequency produced by the periodicity of groups of dots of the latent-image threshold patterns (large dots) and spaces becomes relatively inconspicuous.

In this embodiment, the method of laying out latent-image threshold patterns in the latent-image part in a checkered pattern will be referred to as a "checkered pattern layout of latent-image threshold patterns in the latent-image part" or simply as "checkered pattern layout".

In this "checkered pattern layout", since latent-image threshold patterns may or may not be laid out in some cases at the boundary between the latent-image part and background-image part of the copy-forgery-inhibited pattern basic image, the dot density at the boundary between the latent-image part and background-image part becomes nonuniform, and a boundary line often becomes conspicuous. In such case, the latent-image part and background-image part can be switched for respective pixels of the copy-forgery-inhibited pattern basic image in place of latent-image threshold patterns.

This process can be described by:

$$nWriteDotOn = nCamouflage \times (nSmallDotOn \times \overline{nHiddenMark} + nLargeDotOn \times (nHiddenMark \times nChecker))$$

In the aforementioned "checkered pattern layout", groups of dots of latent-image threshold patterns are laid out to be approximate to a halftone dot screen at a screen angle of 45°, the visual characteristics can be improved, but a white background region of latent-image threshold patterns becomes conspicuous due to contrast from the background of the copy-forgery-inhibited pattern image and groups of dots of latent-image threshold patterns with increasing density of the copy-forgery-inhibited pattern image.

In order to obscure the white background region of each latent-image threshold patterns, a case will be examined below wherein the latent-image part is divided into two regions, latent-image threshold patterns are laid out in one region, and background threshold patterns are laid out in the other region.

More specifically, the flag nChecker is switched between 1 and 0 for respective latent-image threshold patterns like the checkered pattern, latent-image threshold patterns are laid out in a region which corresponds to the latent-image part and in which the flag nChecker is one bit (e.g., 1) (this region will be referred to as region A hereinafter), and background threshold patterns are laid out in a region which corresponds to the latent-image part and in which the flag nChecker is the other bit (e.g., 0) (this region will be referred to as region B hereinafter).

ON/OFF of dots of the copy-forgery-inhibited pattern image can be described by:

$$nWriteDotOn = \\ nCamouflage \times (nSmallDotOn \times \overline{(nHiddenMarkLattice \times nChecker)} + \\ nLargeDotOn \times (nHiddenMarkLattice \times nChecker))$$

If nCamouflage=1,
when nHiddenMarkLattice=0 and nChecker=0,
nWriteDotOn=nSmallDotOn
when nHiddenMarkLattice=0 and nChecker=1,
nWriteDotOn=nSmallDotOn
when nHiddenMarkLattice=1 and nChecker=0,
nWriteDotOn=nSmallDotOn
when nHiddenMarkLattice=1 and nChecker=1,
nWriteDotOn=nLargeDotOn
In this way, latent-image threshold patterns are laid out in only region A of the latent-image part.

In the following description, the method of dividing the latent-image part into two regions, and laying out both the latent-image and background threshold patterns will be referred to as a "crossover layout of latent-image and background threshold patterns in the latent-image part" or simply as a "crossover layout". The method of dividing the latent-image part into a checkered pattern for respective latent-image threshold patterns can be referred to as a checkered pattern type crossover layout.

Figure 12C:
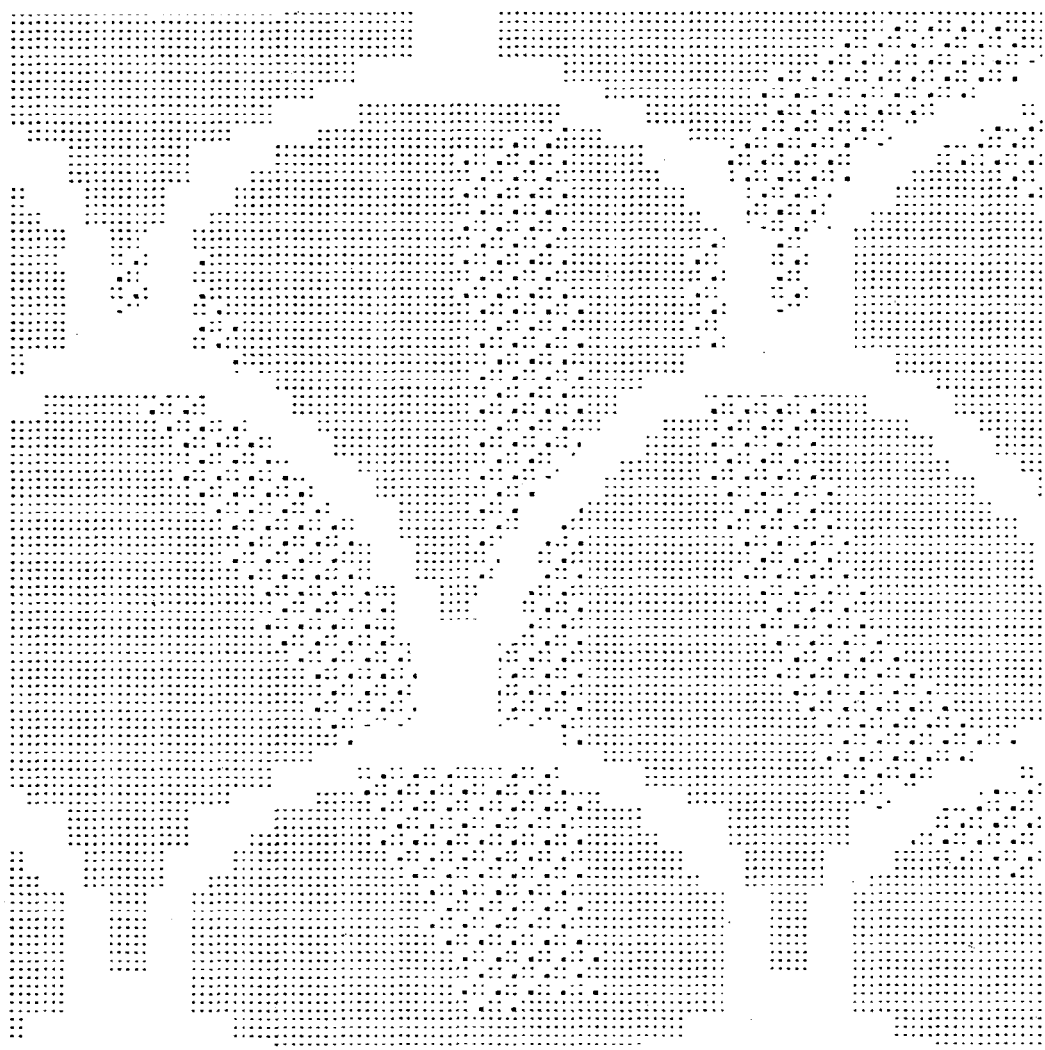
FIG. 12C shows an example of a copy-forgery-inhibited pattern image with a checkered pattern type crossover layout.
Figure 12D:
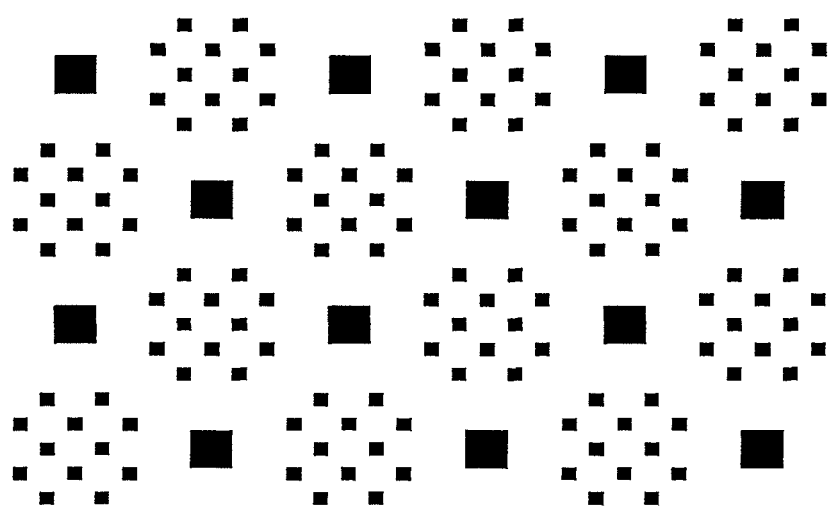
FIG. 12D is an enlarged view of a region designated by a copy-forgery-inhibited pattern basic image shown in FIG. 12C.

FIG. 12C shows an example of a copy-forgery-inhibited pattern image with the checkered pattern type crossover layout, which is generated using the above equation. FIG. 12D is an enlarged view of a region designated by the copy-forgery-inhibited pattern basic image in FIG. 12C.

In FIG. 12C, since latent-image threshold patterns have substantially the same layout as that of a halftone dot screen at a screen angle of 45°, the spatial frequency due to the periodicity of latent-image threshold patterns (large dots) become inconspicuous. This is a merit of the "checkered pattern layout" in terms of image quality.

Also, the density per unit area becomes uniform at the boundary line between the latent-image part and background-image part, and an effect of obscuring the boundary line can be obtained. This is a merit of the tile layout in terms of image quality. Also, since the aforementioned "crossover layout" obscures the latent-image part, it is a merit of the "tile layout" in terms of image quality.

Furthermore, in the aforementioned "crossover layout", paper white (plain) regions formed due to the presence of groups of dots of latent-image threshold patterns have substantially the same layout as a that of a halftone dot screen at a screen angle of 45°. Although paper white regions become more conspicuous with increasing density of the copy-forgery-inhibited pattern image, the aforementioned "crossover layout" can also visually obscure paper white regions, and not only groups of dots but also paper white regions become visually inconspicuous.

Note that latent-image threshold patterns of the latent-image part in the aforementioned "crossover layout" are about the half of those in the tile layout, and the density of the latent-image that emerges upon copying is lower than that of the "tile layout".

However, such low density does not pose any serious problem when the latent-image part has a density that can be easily recognized by a person. The on-demand copy-forgery-inhibited pattern generation method by a printer is susceptible to the density variations of the printer. The presence of not only density variations due to an environment or aging but also those in the plane of paper can provide an effect of making it harder to recognize the latent-image of the copy-forgery-inhibited pattern image.

Therefore, the aforementioned "crossover layout" can achieve not only an effect of obscuring the latent-image of the copy-forgery-inhibited pattern image but also an effect of allowing the on-demand copy-forgery-inhibited pattern generation method by a printer which readily causes density variations to stably generate a copy-forgery-inhibited pattern image in which a latent-image is inconspicuous. As a result, the frequency of test printing processes to be described in detail later) can be reduced.

When the aforementioned "crossover layout" is used, the density of the latent-image part (a region of nHiddenMarkLattice=1) is given by the density of background threshold patterns/2+the density of latent-image threshold patterns/2. Therefore, even when copy-forgery-inhibited pattern density parameters used to generate a copy-forgery-inhibited pattern image in which the print densities of the latent-image part and background-image part are approximate to each other in the "tile layout" are directly applied to the "crossover layout", the print densities of the latent-image part and background-image part can be substantially similarly approximate to each other as a merit.

That is, the "tile layout" and "crossover layout" generate substantially the same density on the entire copy-forgery-inhibited pattern image, and use substantially the same copy-forgery-inhibited pattern density parameters which are used to generate a copy-forgery-inhibited pattern image in which the print densities of the latent-image part and background-image part are approximate to each other. Therefore, the "tile layout" and "crossover layout" can use common copy-forgery-inhibited pattern density parameters.

By exploiting a feature of substantially approximate copy-forgery-inhibited pattern density parameters, means that allows the user who wants to generate a copy-forgery-inhibited pattern image to select one of two options from an input menu can be provided.

Normal mode (tile layout)
High image quality mode (crossover layout)
As a variation of the aforementioned "crossover layout", a third threshold pattern which is different from a background threshold pattern may be used, and latent-image threshold patterns and third threshold patterns may be laid out to cross in a checkered pattern.

In this case, ON/OFF of dots of a copy-forgery-inhibited pattern image can be described by:

$$nWriteDotOn = nCamouflage \times (nSmallDotOn \times \overline{nHiddenMarkLattice} +$$
$$nThirdDotOn \times (nHiddenMarkLattice \times \overline{nChecker}) +$$
$$nLargeDotOn \times (nHiddenMarkLattice \times nChecker))$$

where nThirdDotOn is the third threshold pattern.
If nCamouflage=1,
when nHiddenMarkLattice=0 and nChecker=0,
nWriteDotOn=nSmallDotOn
when nHiddenMarkLattice=0 and nChecker=1,
nWriteDotOn=nSmallDotOn
when nHiddenMarkLattice=1 and nChecker=0,
nWriteDotOn=nThirdDotOn
when nHiddenMarkLattice=1 and nChecker=1,
nWriteDotOn=nLargeDotOn In this way, various threshold patterns having different features as that of the latent-image threshold pattern can be selected as the third threshold pattern. When the user wants to clear the third threshold pattern after copying, the third threshold pattern may be generated using the dot-scattering dither matrix.

The third threshold pattern including a plurality of dot groups relatively smaller than those of the latent-image threshold pattern may be generated.

The third threshold pattern may be generated using a dot-concentration dither matrix which has a feature different from that for the latent-image threshold pattern.

A binary pattern having the same size as the latent-image threshold pattern may be manually generated for each gray level.

In this embodiment, when the latent-image part designated by the copy-forgery-inhibited pattern basic image is divided into a region made up of the latent-image threshold patterns (region A) and a region made up of the third threshold patterns (region B), information like a checkered pattern which is switched for respective units as large as the latent-image threshold pattern is generated. However, the latent-image part may be divided using other kinds of information.

For example, information such as random noise which is randomly switched between 0 and 1 for respective latent-image threshold patterns, or a binary image having blue noise characteristics with few low-frequency components and many high-frequency components may be used, thus adopting visually preferred various binary images. Note that the value of the flag nChecker is switched between 0 and 1 for respective latent-image threshold patterns in the same manner as in the checkered pattern.

According to this embodiment, a binary image with a checkered pattern is applied in addition to the copy-forgery-inhibited pattern basic image that designates the latent-image part and background-image part, groups of dots are laid out in a region which is designated as the latent-image part and corresponds to one region (region A) of the checkered pattern. At the same time, dots having features different from those laid out in region A are laid out in a region which is also designated as the latent-image part and corresponds to the other region (region B) of the checkered pattern. With this arrangement, the layout of groups of dots is set to be equivalent to that at a screen angle of 45° in a halftone dot screen to realize an effect of making it harder to perceive for human. Furthermore, since dots are laid out in each region B, even a paper-white region which is always formed around groups of dots and becomes conspicuous due to the density difference from the copy-forgery-inhibited pattern image has a layout equivalent to that at a screen angle of 45° in halftoning, and can be visually obscured.

In the aforementioned embodiment, the area ratio of regions A and B is set to be 1:1 upon switching regions A and B in the checkered pattern. However, the present invention is not limited to such specific area ratio.

For example, if regions A and B are switched on the basis of the values of white and black pixels of a binary pattern (which has blue noise characteristics) obtained by binarizing a blue noise mask by a predetermined gray level, the area ratio of regions A and B changes depending on the gray level used to binarize the blue noise mask.

That is, the number of large dots that remain after copying increases with increasing area of region A, thus providing a merit of making it easier to recognize an image to be visualized after copying. Therefore, the area ratio of regions A and B can be arbitrarily determined according to the purpose intended.

In this embodiment, the latent-image part is divided into two regions, i.e., regions A and B. However, the present invention is not limited to two regions, but the latent-image part may be divided into three or more regions. For example, the latent-image part may be divided into three regions, which are specified as a large dot region, small dot region, and no-dot generation region (plain region), and a copy-forgery-inhibited pattern image may be generated to arbitrarily lay out these regions, thus also achieving the object of the present invention.

The process in the composition unit 102 that composites the copy-forgery-inhibited pattern image generated by the aforementioned copy-forgery-inhibited pattern image generation unit 101 and an input document image (e.g., a slip, certificate, or the like) will be described below.

FIG. 13 shows a composition process of an input document image and copy-forgery-inhibited pattern image. Referring to FIG. 13, reference numeral 1301 denotes text attribute data; 1302, graphic attribute data; and 1303, an image attribute copy-forgery-inhibited pattern image.

The composition unit 102 superposes the images 1301 to 1303 in accordance with the priority order (layer structure) associated with a layout in software manner using a rendering interface of an OS, thus generating an image 1304 obtained by compositing the text attribute data, graphic attribute data, and image attribute copy-forgery-inhibited pattern image. This process is substantially the same as screen rendering (display rendering) in drawing software as a general application of a computer. Note that the composition unit 102 may execute a unique image composition process independent from the rendering interface process of the OS.

In the example shown in FIG. 13, the image attribute copy-forgery-inhibited pattern image 1303 is superposed as the lowermost layer of the text attribute data 1301 and graphic attribute data 1302. For example, at a position where the image attribute copy-forgery-inhibited pattern image 1303 and text attribute data 1301 are to be superposed, the text attribute data 1301 is preferentially rendered. Therefore, the copy-forgery-inhibited pattern image is appropriately laid out on the background of the input document image, and does not lower the visibility of the text attribute data and graphic attribute data.

In the example shown in FIG. 13, the copy-forgery-inhibited pattern image 1303 has the same size as that of the input image. When the copy-forgery-inhibited pattern image is to be superposed only on a local region, the copy-forgery-inhibited pattern image generation unit 101 inputs an input background image with a size corresponding to the local region, and generates only a copy-forgery-inhibited pattern image that matches the input image size, and the composition unit 102 can composite it to the input document image. As the copy-forgery-inhibited pattern image to be generated has a smaller size, the processing in the copy-forgery-inhibited pattern image generation unit 101 can be speeded up.

The copy-forgery-inhibited pattern composited output document image output from the composition unit 102 may be data expressed by the rendering interface of the OS or a bitmap image as a composition result. The copy-forgery-inhibited pattern composited output document image is sent to the next print data processing unit 103.

The print data processing unit 103 receives the copy-forgery-inhibited pattern composited output document image composited by the composition unit 102 as rendering information via the rendering interface of the OS, and sequentially converts it into commands. At this time, the unit 103 executes image processes such as a color matching process, RGB-CMYK conversion, halftone process, and the like. The print data processing unit 103 sends a data format (e.g., a data format described in the page description language or a data format rasterized to a print bitmap) that can be interpreted by the print unit 104 as copy-forgery-inhibited pattern composited output document image data to the next print unit 104.

The print unit 104 prints out a copy-forgery-inhibited pattern composited output document in accordance with the information of the input copy-forgery-inhibited pattern composited output document image data.

Figure 14:
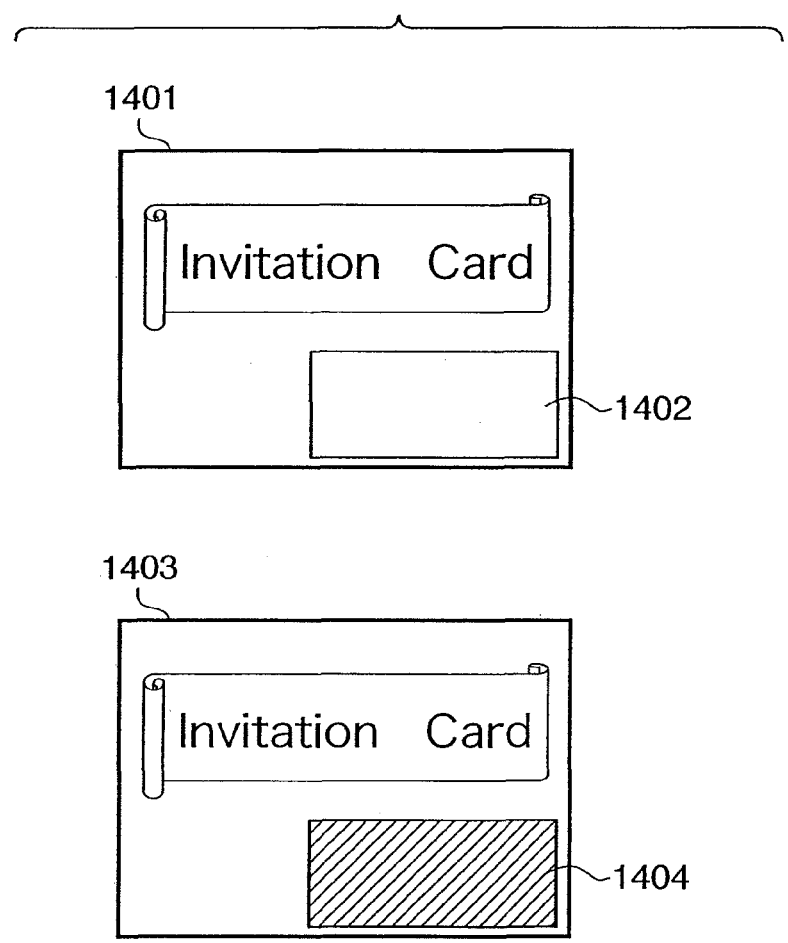
FIG. 14 is a view showing a method of compositing a copy-forgery-inhibited pattern image to an input document image to which various images have already been composited and which has no layer structure.

FIG. 14 shows a method of compositing a copy-forgery-inhibited pattern image to an input document image which has already been composited with various images and has no layer structure. Referring to FIG. 14, reference numeral 1401 denotes an input document image which has already been composited with various images and has no layer structure; and 1402, a region which has a specific pixel value (e.g., a white background region) and at which a copy-forgery-inhibited pattern image is to be laid out.

Note that the remaining region of the input document image 1401 has no specific value (e.g., it is not a white background region).

Figure 15:
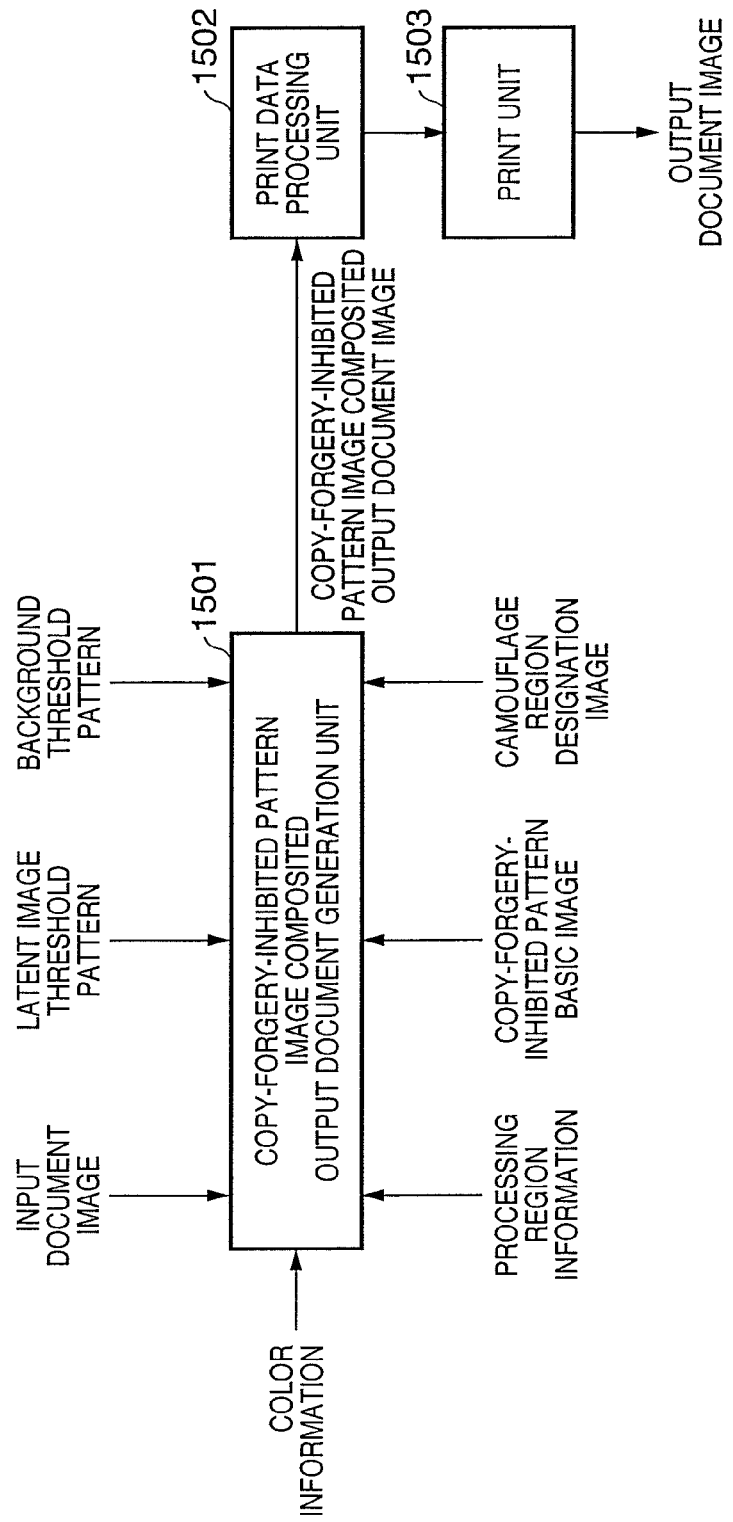
FIG. 15 is a block diagram showing the internal arrangement of a copy-forgery-inhibited pattern compositing/printing apparatus for compositing a copy-forgery-inhibited pattern image to an input document image to which various images have already been composited and which has no layer structure.

FIG. 15 is a block diagram showing the internal arrangement of a copy-forgery-inhibited pattern compositing/printing apparatus for compositing a copy-forgery-inhibited pattern image to an input document image which has already been composited with various images and has no layer structure. The copy-forgery-inhibited pattern compositing/printing apparatus shown in FIG. 15 is suited to a case wherein a copy-forgery-inhibited pattern image is to be composited to an image (e.g., 1401) which has already been composited with various images and has no layer structure.

As shown in FIG. 15, this copy-forgery-inhibited pattern compositing/printing apparatus comprises a copy-forgery-inhibited pattern image composited output document generation unit 1501, print data processing unit 1502, and print unit 1503. The copy-forgery-inhibited pattern image composited output document generation unit 1501 receives an input document image, color information, processing region information, latent-image threshold pattern, background threshold pattern, copy-forgery-inhibited pattern basic image, and camouflage region designation image, and generates and outputs a copy-forgery-inhibited pattern image composited input document.

The copy-forgery-inhibited pattern image composited output document generation unit 1501 detects a region having a specific pixel value (e.g., a white background region) from an input document image, composites a copy-forgery-inhibited pattern image to only that region, and outputs a copy-forgery-inhibited pattern image composited output document image. More specifically, whether or not a pixel value corresponding to a copy-forgery-inhibited pattern image is to be written in a pixel in the input document image is determined using:

$$nWriteDotOn = nBackground \times nCamouflage \times \qquad (3)$$
$$(nSmallDotOn \times \overline{nHiddenMark} + nLargeDotOn \times nHiddenMark)$$

which is prepared by multiplying equation (3) by an item (nBackground) that refers to the input document image.

Note that nBackground=1 when the input document image is a region (white background region) with a specific pixel value; otherwise, nBackground=0.

As in the copy-forgery-inhibited pattern image generation unit 101 shown in FIG. 1, the copy-forgery-inhibited pattern image composited output document generation unit 1501 can speed up processes by omitting unnecessary calculations. Since nBackground is a multiplication to the whole equation, equation (3) is calculated for only a pixel with nBackground=1 to determine whether or not a pixel value corresponding to a copy-forgery-inhibited pattern image is written is determined.

Since the copy-forgery-inhibited pattern image composited output document generation unit 1501 executes substantially the same process as that of the copy-forgery-inhibited pattern image generation unit 101 shown in FIG. 1 except that it refers to pixel values of the input document image, a detailed description thereof will be omitted.

The copy-forgery-inhibited pattern image composited output document image generated by the copy-forgery-inhibited pattern image composited output document generation unit 1501 is output to the print data processing unit 1502. The print data processing unit 1502 executes substantially the same process as that in the print data processing unit 103 shown in FIG. 1. At this time, the region composited with the copy-forgery-inhibited pattern image preferably undergoes image processes that skip a color conversion process such as color matching or the like, so as to prevent a pixel value of one pixel from forming a dot of a mixed color expressed by a plurality of different inks or toners upon printing.

The print data processing unit 1502 converts the processed data into a data format (e.g., a data format described in the page description language or a data format rasterized to a print bitmap) that can be interpreted by the print unit 104 and sends it as copy-forgery-inhibited pattern composited output document image data to the next print unit 1503.

The print unit 1503 prints out a copy-forgery-inhibited pattern composited output document in accordance with the information of the input copy-forgery-inhibited pattern composited output document image data. In this manner, a copy-forgery-inhibited pattern image can be composited to a region having a specific pixel value (e.g., a white background region) of an input document image, and a composite image can be output.

According to the aforementioned embodiment, a copy-forgery-inhibited pattern image can be efficiently laid out and composited to a predetermined region of an input image by executing logical operations using background and latent-image threshold patterns as already binarized patterns, a copy-forgery-inhibited pattern basic image as a binary image that designates the latent-image part and background-image part, a camouflage region designation image as a binary image that designates a camouflage region, and bit information indicating whether or not a pixel value of an input image is a predetermined pixel.

Also, a copy-forgery-inhibited pattern image can be generated at high speed using a small memory size by executing logical operations using background and latent-image threshold patterns as binary images, a copy-forgery-inhibited pattern basic image as a binary image that designates the latent-image part and background-image part, and a camouflage region designation image as a binary image that designates a camouflage region.

Furthermore, a copy-forgery-inhibited pattern image can be efficiently laid out in a predetermined region (e.g., a white background region) of an input image by checking if the copy-forgery-inhibited pattern image is to be composited to the input image by logical operations using bit information indicating whether or not the pixel value of an input image is a predetermined pixel with reference to the pixel value of the input image as needed.

The generation method of a copy-forgery-inhibited pattern image and the composition method of the copy-forgery-inhibited pattern image and input document image have been explained in detail. However, when a copy-forgery-inhibited pattern image is to be actually output using a printer, the latent-image part and background-image part are not always output at densities the user intended due to various causes.

The causes include density instability depending on various conditions such as different engine characteristics of printers, different dither matrices used to output threshold patterns, individual differences of printers, print environments such as humidity, temperature, and the like, aging of an engine, different paper sheets (media), different inks or toners of printers, and the like. That is, input gray levels optimal to the dither matrices for the background-image part and latent-image part are more likely to vary depending on printer models, dither matrices, printers themselves, print environments, paper sheets, inks and toners, and the like.

Therefore, even when the engine characteristics of printers or print environments are different, a copy-forgery-inhibited pattern image must be generated after background and latent-image threshold patterns which have nearly equal densities upon printing are obtained. However, it is practically difficult to automatically calculate optimal background and latent-image threshold patterns in consideration of all variation factors including variations due to a print environment.

Hence, a function of obtaining background and latent-image threshold patterns which can set the background-image and latent-image parts to have substantially the same densities for each printer before execution of the copy-forgery-inhibited pattern compositing/printing apparatus, i.e., a copy-forgery-inhibited pattern density calibration function need be implemented.

As a method of implementing the copy-forgery-inhibited pattern density calibration function, a method of changing the gray level of an input image signal input to one or both of the background dither matrix and latent-image dither matrix so as to adjust the densities to be substantially equal to each other may be used.

Figure 16:
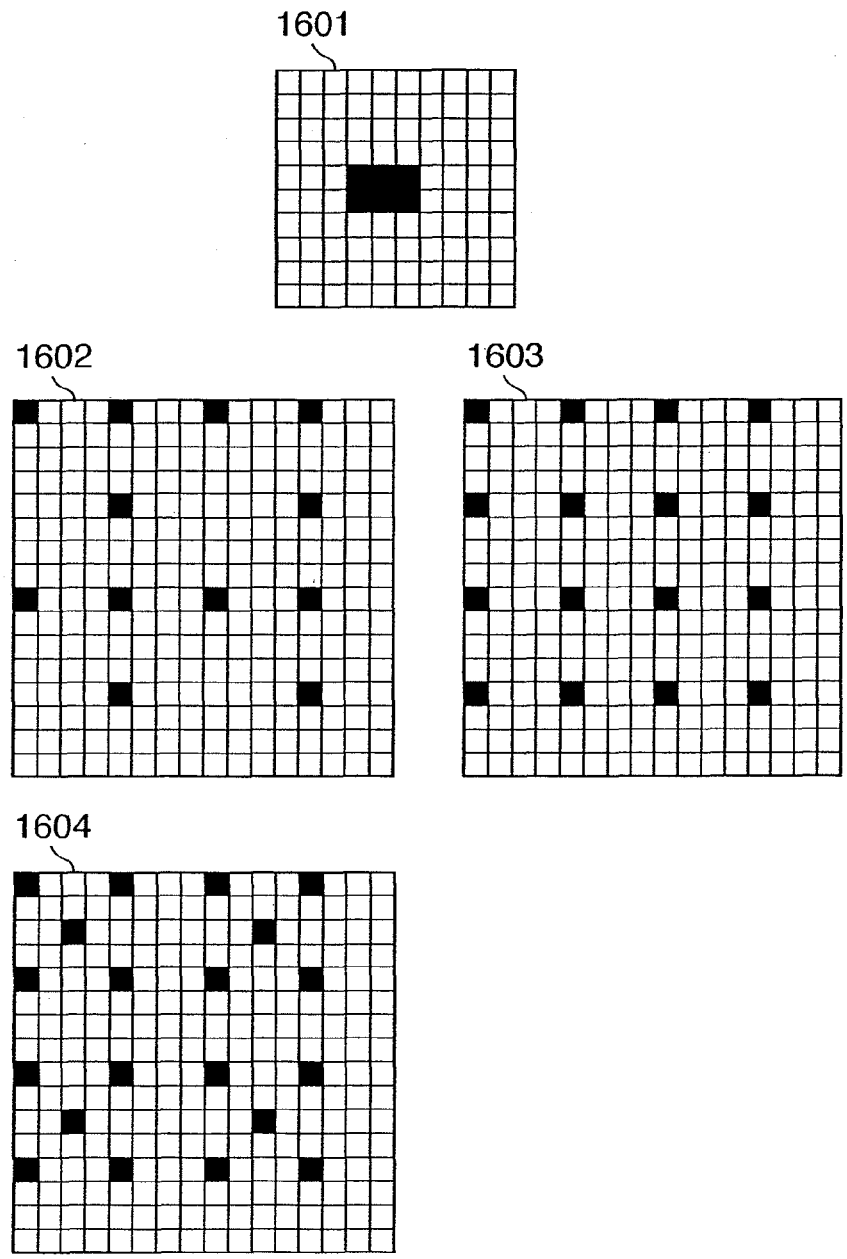
FIG. 16 shows a latent-image threshold pattern and background threshold patterns obtained by applying a threshold process to the gray levels of a plurality of input image signals using a dither matrix.

FIG. 16 shows a latent-image threshold pattern and background threshold patterns obtained by applying a threshold process to the gray levels of a plurality of input image signals using a dither matrix. Referring to FIG. 16, reference numeral 1601 denotes a latent-image threshold pattern obtained by inputting a gray level "6" to a latent-image dither matrix which is defined by 10 pixels per side. The area ratio of black pixels is 6%.

On the other hand, reference numerals 1602 to 1604 denote background threshold patterns obtained by respectively inputting gray levels "12", "16", and "20" to a background dither matrix which is defined by 16 pixels per side. The area ratios of black pixels of these patterns are respectively 4.69%, 6.25%, and 7.81%. If a background dither matrix is defined by 4×4 pixels, and undergoes density adjustment by changing the gray level of an input image signal, the area ratio of black pixels has only a range of 17 steps (=4×4+1), and only a change in gray level of about 6% per step is given. For this reason, a delicate density adjustment cannot be done.

However, the density of each of the background threshold patterns 1602 to 1604, which are output from the dither matrix which can express many gray levels, can be finely adjusted by selecting the gray level of an input image signal, and such patterns are suitable for density calibration.

An overview of a copy-forgery-inhibited pattern test printing process required to implement the copy-forgery-inhibited pattern density calibration function will be explained below. The copy-forgery-inhibited pattern test printing process can be implemented by an application or printer driver on a computer.

Figure 22:
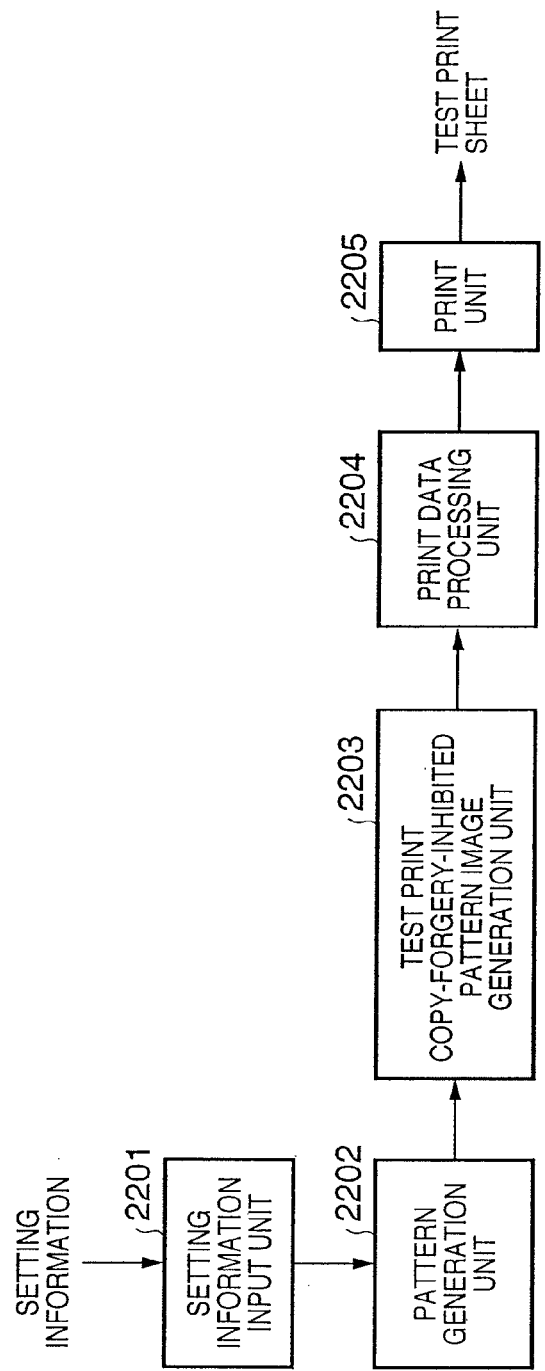
FIG. 22 is a block diagram showing the internal arrangement of an apparatus which executes a copy-forgery-inhibited pattern test printing process.

FIG. 22 is a block diagram showing the internal arrangement of an apparatus that executes a copy-forgery-inhibited pattern test printing process. As shown in FIG. 22, the apparatus that executes the copy-forgery-inhibited pattern test printing process has a setting information input unit 2201, pattern generation unit 2202, test print copy-forgery-inhibited pattern image generation unit 2203, print data processing unit 2204, and print unit 2205.

Note that the apparatus arrangement is not limited to this, and need only have an arrangement that can solve the problems of the present invention. Also, the apparatus need not be exclusively used for the copy-forgery-inhibited pattern test printing process.

The setting information input unit 2201 executes a process for reading setting information from an initial setting file that saves setting information, or a process for receiving setting information input via a user interface. The pattern generation unit 2202 generates patterns required to generate a copy-forgery-inhibited pattern on the basis of the setting information input from the setting information input unit 2201, and outputs them to the next test print copy-forgery-inhibited pattern image generation unit. In case of this embodiment, the patterns to be generated based on the input setting information includes a background threshold pattern and latent-image threshold pattern. In the copy-forgery-inhibited pattern test printing process, the pattern generation unit 2202 generates a plurality of background threshold patterns and latent-image threshold patterns.

The test print copy-forgery-inhibited pattern image generation unit 2203 generates a test block copy-forgery-inhibited pattern image on the basis of the patterns input from the pattern generation unit 2202. Details of the test print copy-forgery-inhibited pattern image generation unit 2203 will be described later.

The print data processing unit 2204 applies required image processes to the test print copy-forgery-inhibited pattern image generated by the test print copy-forgery-inhibited pattern image generation unit 2203. Note that the print data processing unit applies image processes to the test print copy-forgery-inhibited pattern image so as to prevent the pixel value (cyan, magenta, yellow, or black) of a copy-forgery-inhibited pattern image from being expressed by any mixed color formed by mixing a plurality of inks or toners upon printing. The test print copy-forgery-inhibited pattern image that has undergone the required image processes is converted into a data format (e.g., a data format described in the page description language or a data format rasterized to a print bitmap) that can be interpreted by the print, and is sent to the next print unit 2204. The print unit 2204 prints out a test print copy-forgery-inhibited pattern image in accordance with the input data.

A test print sheet, on which a plurality of copy-forgery-inhibited pattern images that are generated by the test print copy-forgery-inhibited pattern image generation unit 2203 and are formed by changing the densities of both the background-image and latent-image parts are two-dimensionally laid out, will be explained below. Respective copy-forgery-inhibited pattern image laid out on the sheet will be referred to as patches hereinafter. On the test print sheet on which the densities of the background-image and latent-image parts are changed two-dimensionally, copy-forgery-inhibited patterns from lower densities to higher densities are also printed, and a plurality of patches having substantially the same densities of the background-image and latent-image parts are present within a single sheet. Therefore, the densities of copy-forgery-inhibited patterns can be presented as selectable input values to the user.

In the on-demand copy-forgery-inhibited pattern output method by a printer described so far, the user can freely select the copy-forgery-inhibited pattern basic image, camouflage region designation image, and color information. In addition, the densities of copy-forgery-inhibited patterns can also be set as input values that can be selected by the user. If means that allows the user to select the density of a copy-forgery-inhibited pattern can be provided, a merit of increasing the number of choices can be provided for the user. In order to improve the user's convenience, a device that allows the user to quickly find out an optimal density of a copy-forgery-inhibited pattern image is required. When the test print sheet on which copy-forgery-inhibited pattern images are two-dimensionally laid out by changing the densities of both the background-image and latent-image parts is used, the user can quickly find out copy-forgery-inhibited pattern density parameters (i.e., latent-image and background threshold patterns) required to generate a copy-forgery-inhibited pattern image which has the latent-image and background-image parts with substantially the same densities, and in which a latent-image can clearly emerge upon copying. The test print sheet on which copy-forgery-inhibited pattern images are two-dimensionally laid out by changing the densities of both the background-image and latent-image parts not only allows the user to acquire many kinds of information per sheet, but also has high browsability and convenience. Also, since the number of test print sheets to be output when the user finds out an optimal copy-forgery-inhibited pattern density can be reduced, a paper cost reduction can also be achieved.

Figure 17:
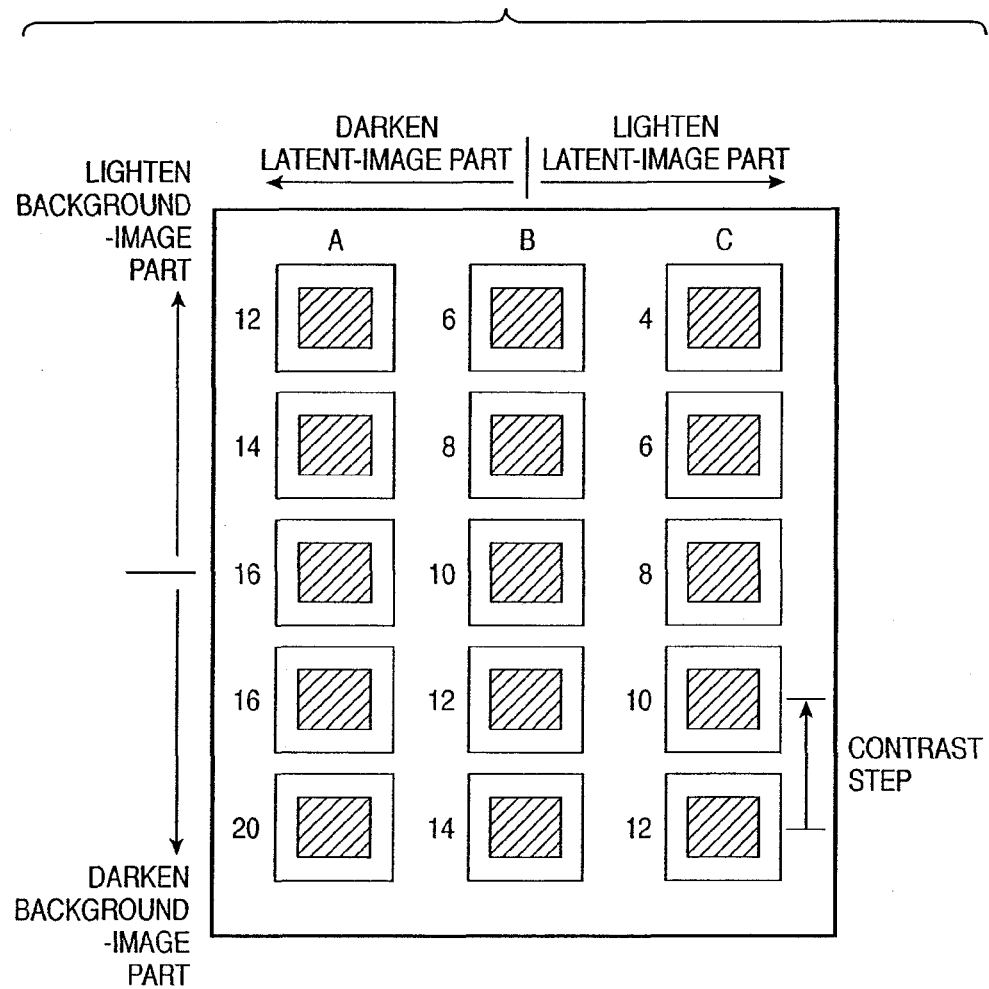
FIG. 17 shows an example of a test print sheet on which patches are two-dimensionally laid out by changing the densities of background-image and latent-image parts.

FIG. 17 shows an example of a test print sheet on which patches are two-dimensionally laid out by changing the densities of the background-image and latent-image parts. Each patch includes the latent-image and background-image parts, and may also include a camouflage region. In each patch in FIG. 17, the central portion indicates the latent-image part, and the circumferential portion indicates the background-image part. In the example shown in FIG. 17, the copy-forgery-inhibited pattern basic image used to designate the latent-image and background-image parts has a rectangular shape. However, the present invention is not limited to the rectangular shape. For example, a character string such as "VOID" or the like may be used. Also, the latent-image and background-image parts may be juxtaposed as independent patches. Hence, the copy-forgery-inhibited pattern basic image is not particularly limited as long as copy-forgery-inhibited pattern images are laid out to be visually recognizable.

On the test print sheet shown in FIG. 17, the density of the latent-image part is changed in the widthwise direction of a paper sheet, and the density of the background-image part is changed in the longitudinal direction. A patch present at the center of each of patch arrays which are laid out in the longitudinal direction is set to have substantially the same densities of the latent-image and background-image parts. As a result, even when density variations are present due to an environment or deterioration of engine performance, the user can easily find out a patch having the substantially the same densities of the latent-image and background-image parts.

However, in practice, since density variations are present due to the printer characteristics and print environment, a patch at the center of each of patch arrays which are laid out in the longitudinal direction does not always have substantially the same densities of the latent-image and background-image parts.

The test print sheet is set so that the density of the background-image part is darkened in one direction (up direction of the plane of the page in FIG. 17), and it is lightened in the other direction (down direction of the plane of the page in FIG. 17).

In the example shown in FIG. 17, the density of the background-image part of a copy-forgery-inhibited pattern is changed in the longitudinal direction. As a method of changing the density of the background-image part, a method of changing the gray level of an input image signal to the background-image part dither matrix is available, as described above.

For example, when the background dither matrix has a size of 16×16 pixels as shown in FIG. 16, the area ratio of black pixels of a threshold pattern changes about 1.5% by changing the gray level of an input image signal to the background dither matrix by 4.

In this embodiment, a change amount of the gray level of an input image signal to the background dither matrix upon changing the density of the background-image part in the test printing process is called a "contrast step", and is used as an index that represents the magnitude of the density adjustment unit of the background-image part.

On the other hand, in the example shown in FIG. 17, the density of the latent-image part is changed in the widthwise direction. As one of methods of changing the density of the latent-image part, a method of fixing the gray level of an input image signal to the latent-image dither matrix, and reducing the vertical and horizontal sizes of the latent-image dither matrix is available.

For example, if a threshold pattern is generated by setting the latent-image dither matrix size to be 10×10 pixels and the gray level of an input image signal to be 9, the area ratio of black pixels is 9%; if a threshold pattern is generated by setting the latent-image dither matrix size to be 12×12 pixels and the gray level of an input image signal to be 9, the area ratio of black pixels is 6.25%; and if a threshold pattern is generated by setting the latent-image dither matrix size to be 14×14 pixels and the gray level of an input image signal to be 9, the area ratio of black pixels is about 4.6%.

Therefore, the density of the latent-image part can be changed by changing the latent-image dither matrix size. When the latent-image dither matrix sizes are 10×10, 12×12, and 14×14, the numbers of gray levels that can be theoretically expressed are 101 levels (=10×10+1), 145 levels (=12× 12+1), and 197 levels (=14×14+1).

As another method of changing the density of the latent-image part, a method of fixing the latent-image dither matrix size, and changing the gray level of an input image signal to the latent-image dither matrix is available. For example, if the latent-image dither matrix size is fixed to 10×10, and the gray level of an input image signal is changed to "6", "9", and "12", the area ratios of black pixels are respectively 6%, 9%, and 12%. However, if dots of the latent-image part are as small as they would disappear after copying, a required condition for the latent-image part (i.e., dots remain even after copying) cannot be met. Therefore, the gray level of an input image signal to the latent-image dither matrix must be set to be equal to or larger than a given level.

As still another method, a latent-image threshold pattern may be generated by changing both the latent-image dither matrix size and the gray level of an input image signal to the latent-image dither matrix, thereby changing the density.

Figure 23:
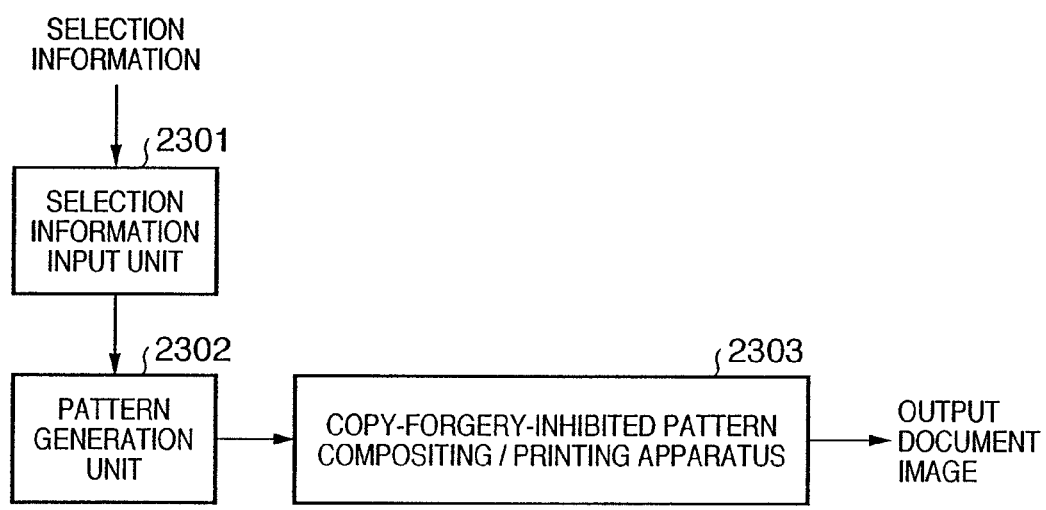
FIG. 23 is a block diagram showing a copy-forgery-inhibited pattern compositing/printing apparatus with a copy-forgery-inhibited pattern density calibration function.

FIG. 23 is a block diagram showing a copy-forgery-inhibited pattern compositing/printing apparatus comprising the copy-forgery-inhibited pattern density calibration function. In this arrangement, a selection information input unit 2301 and pattern generation unit 2302 are connected before the copy-forgery-inhibited pattern compositing/generating apparatus shown in FIG. 1 (2303 in FIG. 23). The internal arrangement of the copy-forgery-inhibited pattern compositing/printing apparatus which has the copy-forgery-inhibited pattern density calibration function will be explained below.

The selection information input unit 2301 inputs information (e.g., a number printed near a patch) associated with a patch which is determined to be optimal one as selection information via a user interface. At this time, a patch of an optimal copy-forgery-inhibited pattern image is the one which has a density of user's choice, and in which the background-image and latent-image parts have substantially the same densities, and the latent-image part remains and the background-image part disappears when a test print sheet is copied using a target copying machine. When the target copying machine is not available, whether or not the latent-image part remains and the background-image part disappears may be checked by copying the test print sheet using an available copying machine.

The pattern generation unit 2302 generates patterns required to generate a copy-forgery-inhibited pattern on the basis of the selection information input from the selection information input unit 2301, and inputs them to the next copy-forgery-inhibited pattern compositing/printing apparatus 2303. In case of this embodiment, the patterns to be generated based on the input selection information include the background and latent-image threshold patterns.

The copy-forgery-inhibited pattern compositing/printing apparatus 2303 generates a copy-forgery-inhibited pattern image on the basis of the background and latent-image threshold patterns input from the pattern generation unit 2302 as the previous stage, composites the copy-forgery-inhibited pattern image to an input document image, and prints out an output document. Since the processes in the copy-forgery-inhibited pattern compositing/printing apparatus 2303 have already been described in detail above, a description thereof will be omitted.

According to this embodiment, the copy-forgery-inhibited pattern compositing/printing apparatus which has the copy-forgery-inhibited pattern density calibration function can be provided.

Even when a patch has equal densities of the background-image and latent-image parts upon printing, if a test print sheet including such patch is copied by the target copying machine, the latent-image part may remain, but the background-image part may not disappear completely.

However, at this time, a patch whose density of the latent-image part is largely different from that after copying may be determined as an optimal one. If a latent-image emerges after copying, an effect as the copy-forgery-inhibited pattern can be provided. In this embodiment, not only a patch in which the latent-image part remains and the background-image part disappears after copying, but also a patch in which the density of the background-image part after copying is sufficiently lower than that of the latent-image part can be selected as an optimal patch.

Figure 18:
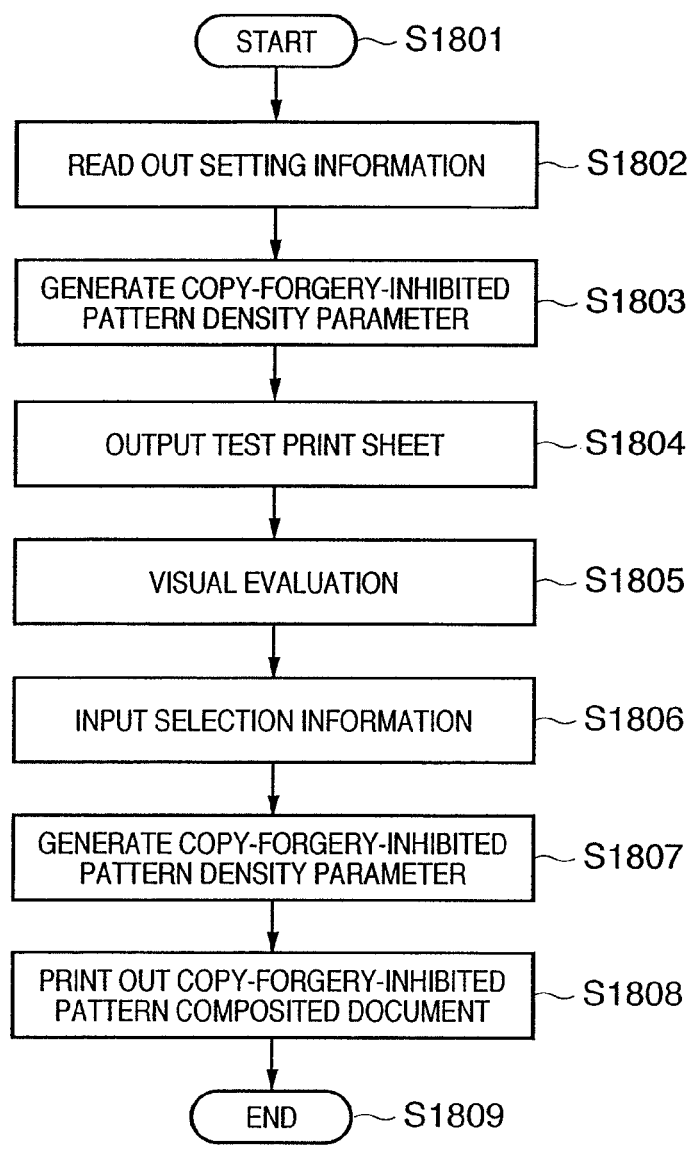
FIG. 18 is a flowchart showing the simplest test print sequence.

FIG. 18 is a flowchart showing the simplest test print sequence. Initially, the test printing process starts in step S1801 in accordance with an input from a user interface or the like. In step S1802, a process for reading setting information from an initial setting file that saves setting information, or a process for receiving setting information input via a user interface is executed. In step S1803, copy-forgery-inhibited pattern density parameters that determine the print densities of the latent-image and background-image parts upon generating a copy-forgery-inhibited pattern image are generated on the basis of the setting information input in step S1802. In this embodiment, the copy-forgery-inhibited pattern density patterns to be generated based on the input setting information include background and latent-image threshold patterns. In step S1804, a test print sheet shown in FIG. 17 is generated on the basis of the copy-forgery-inhibited pattern density parameters input from step S1803, and is printed out by the printer.

In step S1805, the user visually compares the densities of the latent-image and background-image parts of individual patches on the test print sheet. In visual evaluation, the user selects an optimal patch in which the latent-image and background-image parts have substantially equal densities, and the latent-image part remains and the background-image part disappears (or it has a sufficient contrast difference compared to the latent-image part) upon copying the test print sheet by a target copying machine using a number associated with that patch. For example, in the example shown in FIG. 17, patches with different densities are arranged in arrays A, B, and C in the widthwise direction of a paper sheet, patches having background-image parts with different densities are arranged in the longitudinal direction of the paper sheet, and values indicating the densities of the background-image parts are described aside respective patches. Assume that a patch with a preferred density as a copy-forgery-inhibited pattern image is included in array A, and the value that represents the density of the background-image part is 16. In such case, that patch can be selected as A-16.

When the test print function that allows the user to find out an optimal patch by a single test printing process, as shown in FIG. 17, is implemented, the test print sheet often includes patches which have substantially equal densities of the background-image and latent-image parts, and in which latent-images are visually inconspicuous. In such case, the range of threshold patterns that can set substantially equal densities of the background-image and latent-image parts must be recognized as initial device density parameters (device profile data) in consideration of the printer characteristics.

As a practical example of the initial device density parameters, latent-image threshold patterns required to generate copy-forgery-inhibited pattern images in which latent-image parts have densities in arrays A, B, and C of a test print sheet, background threshold patterns which can form background-image parts having print densities substantially equal to those of arrays A, B, and C (i.e., contrast zero patterns in respective arrays), density change widths of background-image parts, which are to be changed in the longitudinal direction of the test print sheet (contrast step parameters in respective arrays), and the like can be used. The density change range of background-image parts (a range of changing background threshold patterns in respective ranges; array A in FIG. 17 has a range from 12 to 20) can also be used as an initial parameter.

In step S1806, the number (e.g., A-16) associated with the patch selected in step S1805 is input as selection information via a user interface or the like. In step S1807, copy-forgery-inhibited pattern density parameters used to determine the print densities of the latent-image and background-image parts of a copy-forgery-inhibited pattern image are generated on the basis of the information input in step S1806. More specifically, the copy-forgery-inhibited pattern density parameters correspond to latent-image and background threshold patterns which can form background-image and latent-image parts to have substantially equal densities, and allow the background-image part to disappear upon copying. In step S1808, a copy-forgery-inhibited pattern image is generated based on the copy-forgery-inhibited pattern density parameters generated in step S1807, and is composited to an input document image, thus printing out a composite image. The process in this step is the same as that of the copy-forgery-inhibited pattern compositing/printing apparatus described using FIG. 1.

In the test print sequence shown in FIG. 18, if the user cannot find out an optimal patch which has latent-image and background-image parts with substantially equal densities from a test print sheet printed by a single test printing process, density calibration cannot be implemented. However, when the printer suffers a large density variation, or when the halftone reproduction characteristics of the printer largely depend on a model or individual, if a large contrast step value is used, an optimal position at which the densities of the background-image and latent-image parts become substantially equal to each other cannot often be found by a single process.

Figure 19:
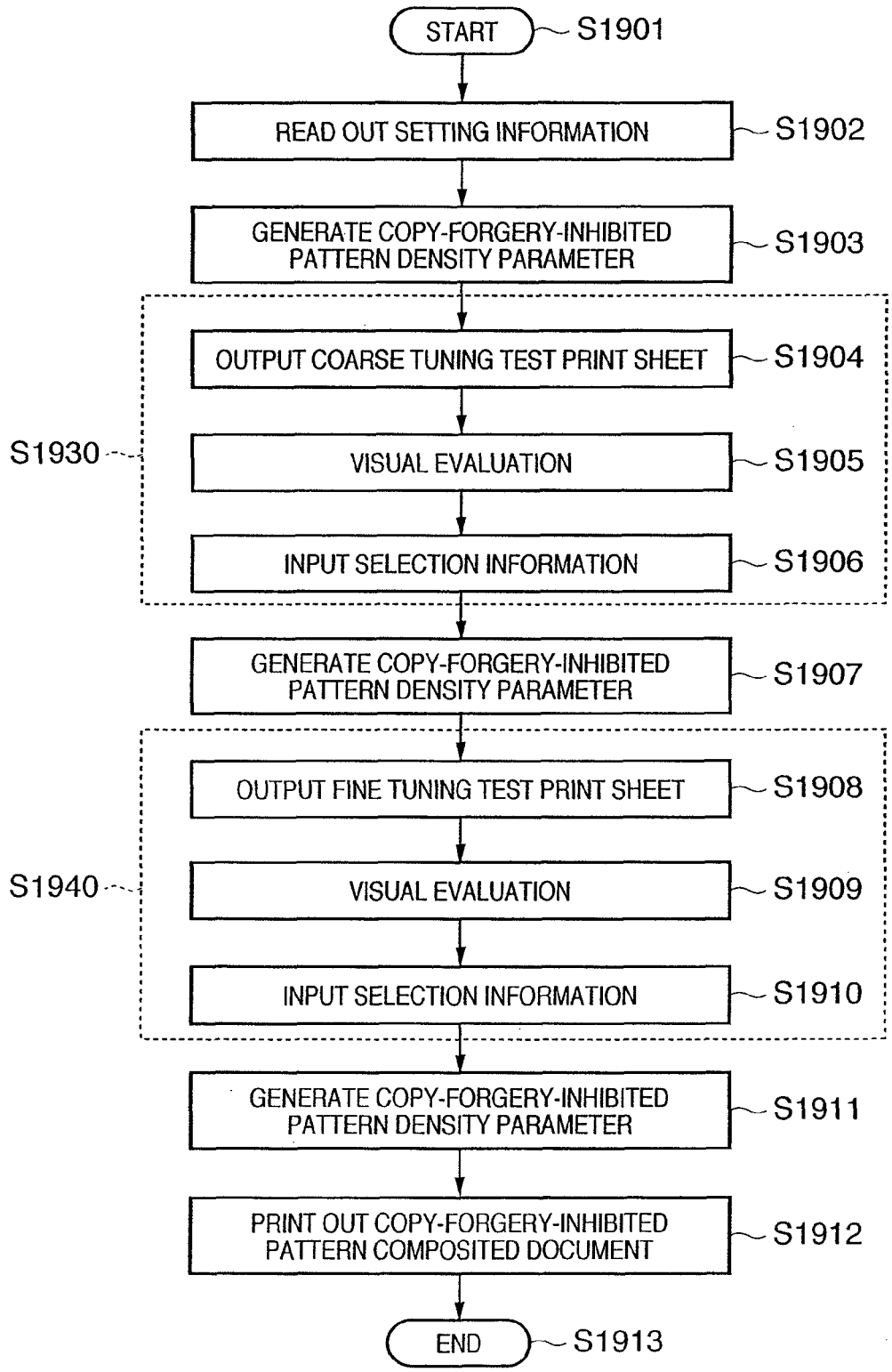
FIG. 19 is a flowchart of a test printing process with a reinforced density adjustment function compared to the test printing process shown in the flowchart of FIG. 18.

FIG. 19 is a flowchart of a test printing process with a reinforced density adjustment function compared to the test printing process shown in the flowchart of FIG. 18. A large difference from FIG. 18 is that this flowchart has two modes, i.e., coarse and fine test print modes.

Step S1930 shown in FIG. 19 is a step of executing the coarse test print mode, and step S1940 is a step of executing the fine test print mode. In the following description, the coarse test print mode as a primary test printing process will be referred to as "coarse tuning", and the fine test print mode as a secondary test printing process will be referred to as "fine tuning".

As internal processes in steps S1930 and S1940, substantially the same processes as those in steps S1804 to S1806 in the simple test printing process shown in FIG. 18 are executed.

FIG. 20 shows two different types of sheets used in the test printing process, the processing sequence of which is shown in FIG. 19. Referring to FIG. 20, reference numeral 2001 denotes an example of a coarse tuning test print sheet to be output in step S1904; and 2002, an example of a fine tuning test print sheet to be output in step S1908.

Two steps of test printing processes will be described in turn below using FIGS. 19 and 20. In the primary test print (coarse tuning) process shown in FIG. 19, a test printing process starts in step S1901 in accordance with an input from a user interface or the like. In step S1902, a process for reading setting information from an initial setting file that saves setting information, or a process for receiving setting information input via the user interface is executed.

In step S1903, copy-forgery-inhibited pattern density parameters that determine the print densities of the latent-image and background-image parts of a copy-forgery-inhibited pattern image are generated on the basis of the setting information input in step S1902. In this embodiment, the copy-forgery-inhibited pattern density patterns to be generated based on the input setting information include background and latent-image threshold patterns. In step S1904, a coarse tuning test print sheet 2001 is generated, and is printed out by the printer.

On the coarse tuning test print sheet 2001, the density of the latent-image part changes in patches which are arranged in the widthwise direction of a paper sheet, and the density of the background-image part changes in patches which are arranged in the longitudinal direction, as in FIG. 19. Also, on the coarse tuning test print sheet 2001, background threshold patterns in patches which are laid out in the longitudinal direction are generated by changing the gray level of an input image signal to the dither matrix in 8-step increments (i.e., contrast step=8).

When the input gray level to the background dither matrix is zero, since no dots are printed on the background-image part, such background-image part is not suited to a copy-forgery-inhibited pattern image. Therefore, another nonzero value (e.g., 8) may be set for a gray level close to zero. However, when an image for the input gray level=0 to the background dither matrix is output, appearance of a latent-image (contrast between the latent-image part and white background) when a background-image part that disappears completely, i.e., in an ideal state wherein the latent-image emerges after copying, can be confirmed as a merit.

On the coarse tuning test print sheet 2001, since a change in density of the background-image part is large between neighboring patches in the longitudinal direction, it is difficult to precisely adjust the densities of the background-image part and latent-image part. However, copy-forgery-inhibited pattern density parameters used to generate a copy-forgery-inhibited pattern image which has a background-image part and latent-image part with substantially the same densities can be quickly narrowed down.

Upon generating a threshold pattern using a Bayer dither matrix, when the input gray level exceeds a half gray level "128", the generated threshold pattern is expressed by dots which contact each other (not by isolated dots), and an effect of disappearance of the background-image part upon copying is hardly obtained. Therefore, for the purpose of finding out an optimal copy-forgery-inhibited pattern image, the background-image part suffices to cover the grayscale range of 0 to 128.

Note that the coarse tuning test print sheet 2001 in FIG. 20 shows only the grayscale range of 0 to 32 of the background-image part for the sake of illustrative convenience. However, the coarse tuning test print sheet 2001 preferably covers the full grayscale range (0 to 256) expressed by a 16×16 background threshold pattern or the grayscale range (0 to 128) that can be used as the background-image part.

The following description will continue under the assumption that the coarse tuning test print sheet 2001 substantially covers the grayscale range from which nearly the same density as that of the latent-image part is expected to be obtained (e.g., 0 to 32 in case of the coarse tuning test print sheet 2001).

In order to find out optimal copy-forgery-inhibited pattern density parameters required to generate a copy-forgery-inhibited pattern image which can approximate the print densities of the latent-image part and background-image part using a printer whose halftone reproduction characteristics are unknown or a printer which suffers a large density variation of the background-image part due to an environment, background threshold patterns are generated at coarse contrast steps to cover the full-value range that the background-image part can assume or the value range that the background-image part can substantially assume, so as to output a test print sheet. In this manner, the range of copy-forgery-inhibited pattern density parameters which can set substantially the same densities of the background-image part and latent-image part can be narrowed down without any pre-existing knowledge even using a printer whose halftone reproduction characteristics are unknown or a printer which suffers a large density variation of the background-image part due to a print environment or aging. Such coarse tuning test print sheet is designed to be generally applied to many printers, and is worthful since it does not require any device-dependent setups.

In step S1905, the densities of the latent-image and background-image parts in respective patches on the test print sheet are visually compared. In this step, substantially the same process as that described in step S1805 is executed. However, since the contrast step of the background-image part is large, there is a high possibility that the number of an optimal patch cannot be found. Therefore, in such case, a range in which an optimal patch is expected to be found is selected.

In this coarse tuning, some methods of designating the range in which an optimal patch is expected to be found are available. In one method, the range in which an optimal patch is expected to be found is designated using a central value. For example, when the third uppermost patch (A-16) has a smallest difference between the densities of the latent-image and background-image parts in array A on the coarse tuning test print sheet 2001, the third uppermost patch (A-16) in array A is designated as the center where an optimal patch is expected to be found.

In fine tuning to be described later, when the background density is changed more finely to have the designated patch as the center, there is a high possibility that optimal copy-forgery-inhibited pattern density parameters required to generate a copy-forgery-inhibited pattern image which has substantially equal densities of the latent-image and background-image parts are found.

In another method, a period in which an optimal patch is expected to be found is designated. For example, assume that the third uppermost patch (A-16) in array A on a coarse tuning test print sheet 2001 has a background-image part lighter than a latent-image part, and the fourth uppermost patch (A-24) has a background-image part darker than a latent-image part. In this case, there is a high possibility that an optimal patch is found between the third and fourth uppermost patches (A-16) and (A-24) in array A. Therefore, a period in which the magnitude relationship between the densities of the background-image and latent-image parts changes is designated as a period in which an optimal patch is expected to be found.

In this case, the user can input the numbers of both the third and fourth uppermost patches (A-16) and (A-24) in array A. However, since the method of designating a period by inputting two input values to an operation menu is often troublesome, the user may calculate an intermediate value between the third and fourth uppermost patches (A-16) and (A-24) and may input the intermediate value (A-20) as the center where an optimal patch is expected to be found.

As in patches in array A, information associated with the center or period where an optimal patch is expected to be found is input to arrays B and C, and corresponding patches can be output using a two-dimensional test print sheet (e.g., the fine tuning test print sheet 2002).

This fine tuning test print sheet 2002 designates patches (B-8) and (C-8) each of which has the smallest difference between the densities of the latent-image and background-image parts in arrays B and C in addition to array A. In this case, copy-forgery-inhibited pattern parameters of different densities can be determined by a single test printing process.

However, when an optimal patch is to be found by changing the density of the background-image part in patches in array A, a test print sheet on which the densities of the background-image and latent-image parts are changed two-dimensionally need not be printed in the fine tuning process, and a test print sheet on which only the density of the background-image part is changed with respect to the latent-image part with the designated density need only be output.

In step S1906, the user who executes the test printing process inputs information, associated with the center or period where an optimal patch is expected to be found from the test print sheet, via the user interface on the basis of the visual evaluation result in step S1905. Although not shown in FIG. 19, information previously input in step S1906 may be saved in a setting file as initial setting information upon executing fine tuning step S1940, and that file may be read out.

In step S1907, copy-forgery-inhibited pattern density parameters required to generate a copy-forgery-inhibited pattern image which can set substantially equal densities of the background-image and latent-image parts are generated on the basis of the information input in step S1906. In this embodiment, a plurality of background threshold patterns which are to be printed as the densities within the range input in step S1906, and a latent-image threshold pattern with the selected density are generated.

In step S1908, a fine tuning test print sheet is generated and printed on the basis of the copy-forgery-inhibited pattern density parameters generated in step S1907. For example, on the fine tuning test print sheet 2002 shown in FIG. 20, the gray level of an input image signal to the background dither matrix is changed more finely to have, as the centers, the third uppermost patch (A-16) in array A, the second uppermost patch (B-8) in array B, and the second uppermost patch (C-8) in array C on the coarse tuning test print sheet 2001, which are selected in the coarse tuning process in step S1907, while setting the contrast step=2. Therefore, patches in which the background-image and latent-image parts have closer densities compared to the coarse tuning test print sheet 2001 can be detected.

In this way, in step S1940 that executes fine tuning, a fine tuning test print sheet which allows the user to find out a patch in which the background-image and latent-image parts have closer densities more accurately than in step S1930 that executes coarse tuning is generated. In step S1909, the densities of the latent-image and background-image parts in respective patches on the test print sheet are visually compared. In visual evaluation, the user finds out a patch in which the latent-image and background-image parts have substantially equal densities, and the latent-image part remains and the background-image part disappears (or it has a sufficient contrast difference compared to the latent-image part) upon copying the test print sheet by a target copying machine, and selects the number (e.g., (A-18)) of the optimal patch from the test print sheet. At this time, if the two-dimensional test printing process is done by also changing the density of the latent-image part, a patch having a preferred density as a copy-forgery-inhibited pattern image can be selected from not only array A but also arrays B and C.

In step S1910, the user inputs the number associated with the patch selected in step S1909 as selection information via the user interface. In step S1911, copy-forgery-inhibited pattern density parameters required to generate a copy-forgery-inhibited pattern image in which the background-image and latent-image parts have approximate print densities are generated on the basis of the information input in step S1910. More specifically, in this embodiment, latent-image and background threshold patterns which can form the background-image and latent-image parts to have nearly equal densities are generated. In step S1912, a copy-forgery-inhibited pattern image is generated based on the copy-forgery-inhibited pattern density parameters generated in step S1911, and is composited to an input document image, thus printing out a composite image. The process in this step is the same as that in the copy-forgery-inhibited pattern printing apparatus described using FIG. 1.

Note that both the processes in step S1930 that executes coarse tuning and step S1940 that executes fine tuning need not always be executed. For example, only upon installing a printer or making a periodic maintenance or when a copy-forgery-inhibited pattern image cannot be appropriately output, coarse tuning step S1930 is executed. When a copy-forgery-inhibited pattern is printed routinely, the process in this step S1930 may be omitted, and only the process in fine tuning step S1940 may be executed.

Since coarse tuning is omitted in ordinary use, the time required for copy-forgery-inhibited pattern density calibration can be reduced. At this time, information associated with appropriate parameters as a copy-forgery-inhibited pattern obtained in step S1930 that executes coarse tuning is saved in a setting file. When only fine tuning is executed while omitting coarse tuning, the patch output range of the fine tuning test print sheet 2002 can be read out from the saved setting file, and the fine tuning test print sheet can be generated. In this case, it is desirable to design to reduce the number of times of coarse tuning to be re-executed even when a print environment has changed, in terms of convenience.

For example, assume that the coarse tuning test print sheet 2001 is printed, a patch (A-16) in array A has the smallest density difference between the latent-image and background-image parts, and a setup for detailed adjustment in the fine tuning process is made to have (A-16) as the center. However, assume that an actual printer has suffered a density variation due to an environment to have a patch (A-20) as the center.

If a density variation due to an environment has occurred to have the patch (A-16) as the center on the fine tuning test print sheet 2002, patches within the range (i.e., A-12 to A-20) of contrast step=4 before and after (A-16) can be followed, and the chance of returning to coarse tuning is reduced. However, when a density variation due to an environment has occurred to have (A-20) as the center, only patches within the range (i.e., A-12 to A-20) of contrast step=8 in one direction can be followed on the fine tuning test print sheet 2002, and coarse tuning must be redone when the density has changed in the direction of A-24.

In such case, when the user selects the center of fine density change in fine tuning from patches on the coarse tuning test print sheet 2001, the contrast step before and after the center on the coarse tuning test print sheet 2001 is set to be twice the contrast step before and after the center required on the fine tuning test print sheet 2002. With this setup, since fine tuning can cover the range of neighboring patches to have the central patch selected from the coarse tuning test print sheet 2001, the chance of returning to coarse tuning can be reduced.

In another example, in fine tuning, a relatively large number of patches may be set so that not only the range before and after the patch selected as the center in coarse tuning but also the range of several patches before and after the center can be covered. In such case, even when a density variation has occurred more or less, the chance of returning to coarse tuning can be reduced.

At this time, although not shown, the apparatus or software which implements the two-step test print function, the processing sequence of which is shown in FIG. 19, has a step of prompting the user to select whether the test printing process starts from coarse tuning or from fine tuning on the basis of information obtained by the previously executed coarse tuning while skipping coarse tuning. If the user selects to start the test printing process from coarse tuning, the processes shown in steps S1902 to S1912 are executed in turn. If the user selects to start the test printing process from fine tuning, the saved information associated with coarse tuning is read out (corresponding to the process in step S1902), copy-forgery-inhibited pattern parameters are generated (corresponding to the process in step S1903), and the subsequent fine tuning processes (steps S1908 to S1912) are executed.

The function of step S1930 that executes coarse tuning may be set as a detailed function (maintenance function) that can be executed by only a service person who installs or maintains a printer, and may be inhibited from being operated by normal users. For example, software that requests a password upon executing this step S1930 may be implemented.

Also, when units except for the print unit (printer controller and printer engine) of the copy-forgery-inhibited pattern compositing/printing apparatus shown in FIG. 1 or 15 are implemented as software in a computer, access control may be applied using an access control function of an OS so that only the administrator of the computer can execute the function of this step S1930.

With the above setups, a trouble that an optimal copy-forgery-inhibited pattern image cannot be found in only step S1940 of executing fine tuning due to a simple setting error or purposeful change by a third party can be avoided.

Furthermore, access control may be applied by similarly requesting a password or administrator's authority for step S1930 of coarse tuning and step S1940 of fine tuning. Not only a normal user can be prevented from falling into a trouble that he or she cannot find an optimal copy-forgery-inhibited pattern image due to a simple setting error or purposeful change by a third party, but also, such user can easily print out a document composited with a copy-forgery-inhibited pattern without considering any copy-forgery-inhibited pattern density calibration.

The fine tuning test print sheet 2002 in FIG. 20 outputs samples generated by changing the densities of both the background-image and latent-image parts. Alternatively, a desired density of the latent-image part may be determined by coarse tuning, and a fine tuning test print sheets that outputs only patches generated by changing the density of the background-image part with respect to the determined density of the latent-image part may be output.

In this case, since the area of patches that can be output increases within a single sheet, a large number of patches may be output per sheet by reducing the contrast step, or patches may be output using the copy-forgery-inhibited pattern basic image and camouflage region designation image, which are scheduled to be printed after they are composited to an actual input document.

On the coarse tuning test print sheet 2001 and fine tuning test print sheet 2002 in FIG. 20, the density and density change width of the background-image part may be common to respective arrays or may be different for respective arrays. The coarse tuning test print sheet 2001 and fine tuning test print sheet 2002 may adopt quite different layouts of copy-forgery-inhibited pattern images.

Finally, the processing sequence of a multi-step test printing process that generalizes the 2-step test print function (coarse tuning and fine tuning) will be described.

Figure 21:
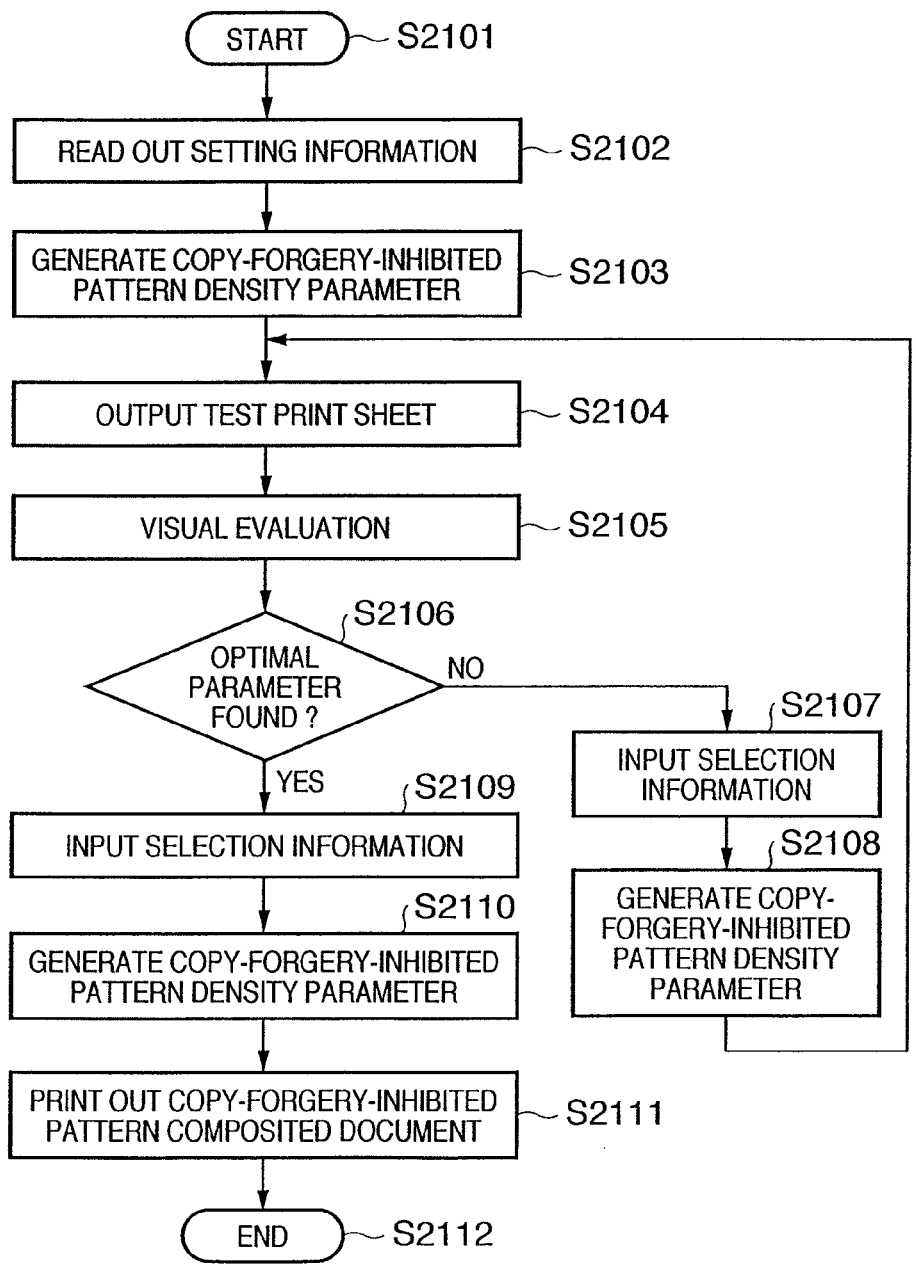
FIG. 21 is a flowchart showing the processing sequence of a multi-step test printing process with an advanced function.

FIG. 21 is a flowchart showing the processing sequence of a multi-step test printing process with an advanced function. A test printing process starts in step S2101 in accordance with an input from a user interface or the like. In step S2102, initial setting information required to generate a copy-forgery-inhibited pattern image is read out. For example, the initial setting information is stored in a setting file in an HDD or memory on a computer, and software of the computer reads it out.

In step S2103, copy-forgery-inhibited pattern density parameters that determine the densities of the latent-image and background-image parts of a copy-forgery-inhibited pattern image are generated on the basis of the setting information input in step S2102. More specifically, in this embodiment, latent-image and background threshold patterns that can form the background-image and latent-image parts to have nearly equal densities are generated.

In step S2104, a test print sheet is generated and printed based on the copy-forgery-inhibited pattern density parameters generated in step S2103. On the test print sheet, patches may be laid out by two-dimensionally changing the densities of the background-image and latent-image parts, or by changing the density of the background-image part, as shown in FIG. 17. It is visually evaluated in step S2105 for each patch on the test print sheet if the background-image and latent-image parts have nearly equal densities, if the latent-image part remains and the background-image part disappears (or it has a sufficient contrast difference compared to the latent-image part) in each patch of the test print sheet copied by a target copying machine, and so forth.

If it is determined in step S2106 that a patch in which the latent-image and background-image parts have substantially equal densities, and the latent-image part remains and the background-image part disappears (or it has a sufficient contrast difference compared to the latent-image part) upon copying the test print sheet by a target copying machine is found from the test print sheet, the flow advances to step S2108. However, if no patch in which the latent-image and background-image parts have substantially equal densities, and the latent-image part remains and the background-image part disappears (or it has a sufficient contrast difference compared to the latent-image part) upon copying the test print sheet by a target copying machine is found, the flow advances to step S2107.

In step S2107, information associated with the center or period where an optimal patch is expected to be found from the test print sheet is input via the user interface using a number or the like associated with the patch, as has already been described using FIG. 10. At this time, a contrast step as an index used to determine the density change width of the background-image part is input together.

As the contrast step, a value smaller than the contrast step used in the already output test print sheet is preferably set. Note that a specification that automatically sets the contrast step value by software may be adopted.

In step S2108, copy-forgery-inhibited pattern density parameters used to determine the print densities of the latent-image and background-image parts of a copy-forgery-inhibited pattern image are generated on the basis of the information input in step S2107. The flow returns to step S2104 to print a test print sheet based on the copy-forgery-inhibited pattern density parameters generated in step S2108. The flow advances to step S2105 again to make visual evaluation again. Information associated with the center or period where an optimal patch is expected to be found is re-set until an optimal patch is found, thus repeating the loop.

In step S2109, a number associated with the patch which is selected in step S2105 and in which the latent-image and background-image parts have substantially equal densities, and the latent-image part remains and the background-image part disappears upon copying the test print sheet by a target copying machine is input via the user interface or the like. In step S2110, copy-forgery-inhibited pattern density parameters used to determine the print densities of the latent-image and background-image parts of a copy-forgery-inhibited pattern image are generated on the basis of the information input in step S2109. More specifically, in this embodiment, latent-image and background threshold patterns which can form the background-image and latent-image parts to have nearly equal densities and allow the background-image part to disappear upon copying are generated.

In step S2111, a copy-forgery-inhibited pattern image is generated based on the copy-forgery-inhibited pattern density parameters generated in step S2110, and is composited to an input document image, thus printing out a composite image. The process in this step is the same as that of the copy-forgery-inhibited pattern compositing/printing apparatus described using FIG. 1.

Finally, a modification of the test print sheets shown in FIGS. 17 and 20 will be described.

Figure 24:
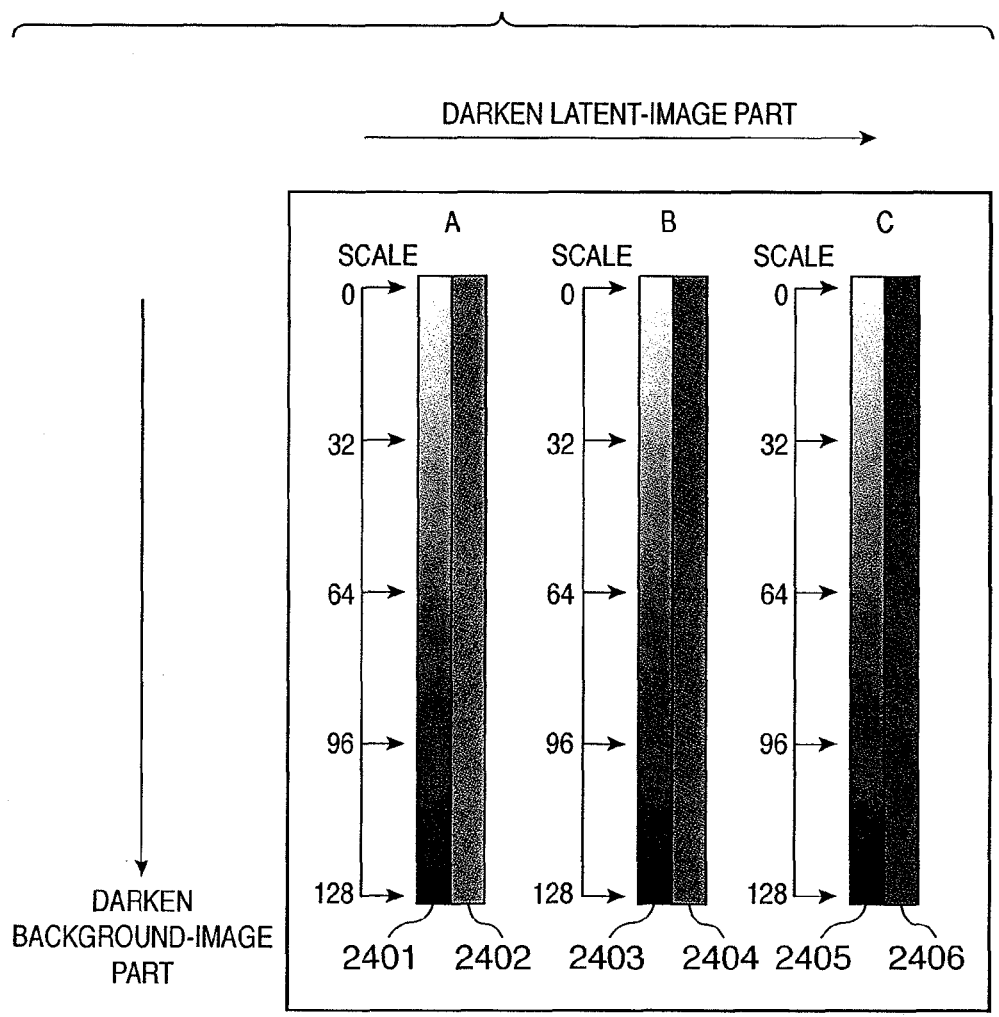
FIG. 24 shows a modification of a test print sheet explained in the first embodiment.

FIG. 24 shows a modification of the test print sheet. On the test print sheets shown in FIGS. 17 and 20, the background-image and latent-image parts are laid out in one patch. On the test print sheet shown in FIG. 24, rectangles (2401, 2403, 2405) of the latent-image part and those (2402, 2403, 2406) of the background-image part are formed, the densities are fixed inside each rectangle of the latent-image part, and columns A, B, and C have different densities.

In each rectangle of the background-image part, the density changes smoothly (to form a gradation from lower to higher densities). The gradation that forms the interior of each rectangle of the background-image part is generated by background threshold patterns based on a background dither matrix. Beside each rectangle of the background-image part, numbers used to identify background threshold patterns are assigned. Upon visually designating the densities of the latent-image and background-image parts, a position where the densities become nearly equal to each other can be designated by a number (e.g., (A-16) or the like) as in the test print sheets shown in FIGS. 17 and 20.

Using the test print sheet shown in FIG. 24, coarse and fine test print functions can be implemented in the same manner as the test print sheets shown in FIGS. 17 and 20. In the coarse test printing process, a gradation range in which the latent-image and background-image parts may have nearly equal densities is designated using a number assigned to the background-image part. In the fine test printing process, the designated gradation range is broadened, and the densities of the background-image and latent-image parts can be compared accurately.

The test print sheet shown in FIG. 24 may be used in place of the coarse tuning test print sheet 2001 shown in FIG. 20. Since the density of the background-image part changes continuously, a point where the densities of the latent-image and background-image parts become nearly equal to each other can be finely and easily determined compared to the coarse tuning test print sheet 2001 which coarsely changes the gray level of the background-image part. Also, a camouflage pattern may be applied to columns A, B, and C, and the densities of the background-image and latent-image parts can be compared using copy-forgery-inhibited pattern images which are approximate to a copy-forgery-inhibited pattern image to be finally generated.

Second Embodiment

The second embodiment according to the present invention will be described in detail hereinafter with reference to the accompanying drawings. In the second embodiment, respective processes described in the first embodiment are implemented by a computer.

Figure 25:
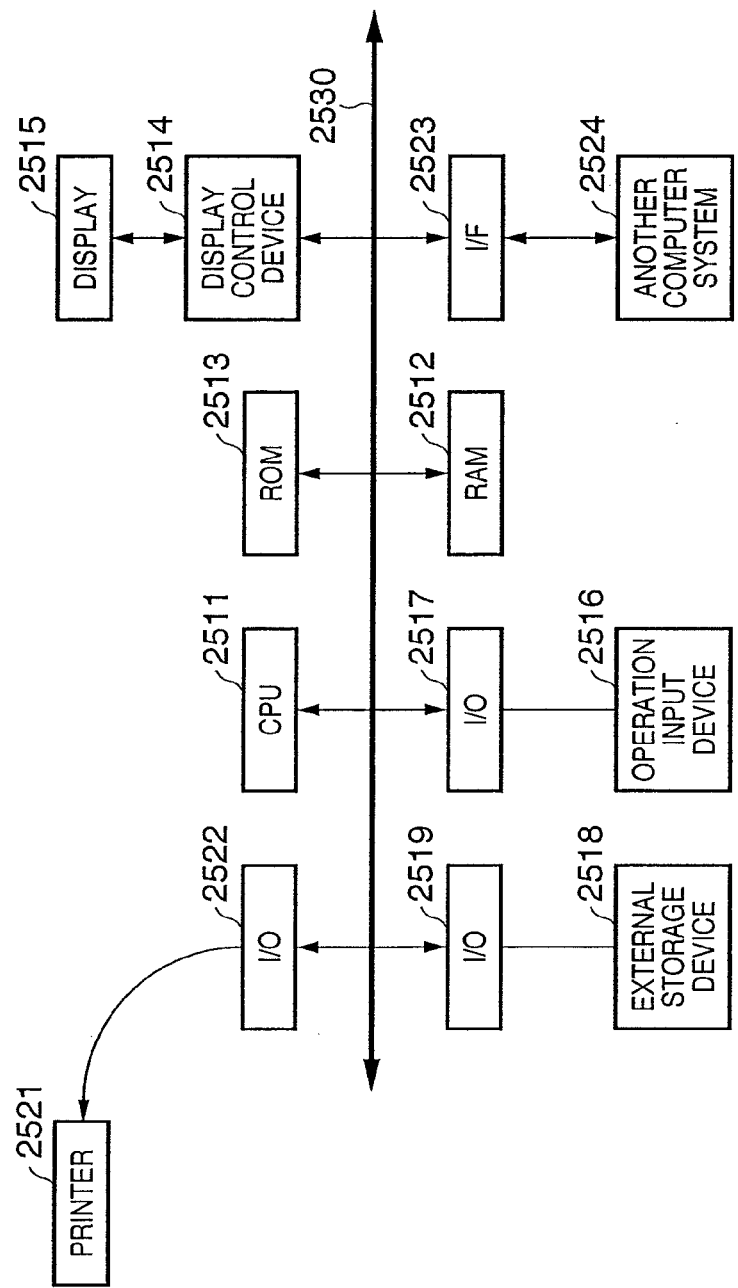
FIG. 25 is a block diagram showing the basic arrangement of a computer in the second embodiment.

FIG. 25 is a block diagram showing the basic arrangement of a computer in the second embodiment. For example, when this computer executes all the functions except for the print unit (or the printer engine of the print unit) in FIGS. 1, 15, 22, and 23 in the first embodiment, the respective functions are expressed by a program, which is loaded by this computer, thus implementing all the functions except for the print unit (or the printer engine of the print unit) in FIGS. 1, 15, 22, and 23 in the first embodiment.

Referring to FIG. 25, reference numeral 2511 denotes a CPU which controls the overall computer, and executes respective processes described in the first embodiment using programs and data stored in a RAM 2512 and ROM 2513. Reference numeral 2512 denotes a RAM which has an area for temporarily storing programs and data loaded from an external storage device 2518 or programs and data downloaded from another computer system 2524 via an I/F (interface) 2523, and also an area required for the CPU 2511 to execute various processes.

Reference numeral 2513 denotes a ROM which stores functional programs, setting data, and the like of the computer. Reference numeral 2514 denotes a display control device which executes a control process for displaying images, characters, and the like on a display 2515. Reference numeral 2515 denotes which displays images, characters, and the like. Note that a CRT, liquid crystal display, and the like can be applied as the display.

Reference numeral 2516 denotes an operation input device which includes devices such as a keyboard, mouse, and the like that allow the user to input various instructions to the CPU 2511. When the user manually inputs the camouflage region designation image, copy-forgery-inhibited pattern basic image, and the like, he or she inputs them via this operation input device 2516. Reference numeral 2517 denotes an I/O which notifies the CPU 2511 of various instructions and the like input via the operation input device 2516.

Reference numeral 2518 denotes an external storage device such as a hard disk or the like, which serves as a large-capacity information storage device, and stores an OS, a program that makes the CPU 2511 execute the processes of the first embodiment, a background dither matrix, a latent-image dither matrix, a generated copy-forgery-inhibited pattern image, an input document image, and the like. Information is written in/read out from the external storage device 2518 via an I/O 2519.

Reference numeral 2521 denotes a printer which outputs a document and image. Output data is sent from the RAM 2512 or external storage device 2518 to the printer 2521 via an I/O 2522. As the printer used to output a document and image, for example, an ink-jet printer, laser beam printer, thermal transfer printer, dot-impact printer, and the like may be used.

Reference numeral 2530 denotes a bus used to interconnect the CPU 2511, ROM 2513, RAM 2512, I/O 2522, I/O 2519, display control device 2514, I/F 2523, and I/O 2517.

In the second embodiment, the processes of the copy-forgery-inhibited pattern compositing/printing apparatus or the copy-forgery-inhibited pattern compositing/printing apparatus with the test print function, except for the print unit, are executed by the computer. Alternatively, processes to be executed by the computer may be executed using a dedicated hardware circuit in the printer instead.

Note that the above embodiments present merely examples of the present invention, and the technical scope of the present invention must not be limited by such embodiments. That is, the present invention can be practiced in various forms without departing from its technical scope or its principal features.

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium, which records a program code of a software program that can implement the functions of the above-mentioned embodiments to the system or apparatus, and reading out and executing the program code stored in the recording medium by a computer (or a CPU or MPU) of the system or apparatus.

In this case, the program code itself read out from the recording medium implements the functions of the above-mentioned embodiments, and the recording medium which stores the program code constitutes the present invention.

As the recording medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the recording medium is written in a memory of the extension board or unit.

The present invention has been explained by way of its preferred embodiments. However, the present invention is not limited to the aforementioned embodiments, and various modifications can be made within the scope of the appended claims.

CLAIM OF PRIORITY

This application claims priority from Japanese Patent Application No. 2003-324690 which was filed on Sep. 17, 2003 and No. 2003-389661 which was filed on Nov. 19, 2003, which are hereby incorporated by reference herein.

What is claimed is:

1. An apparatus comprising:
  a causing unit which causes a printing unit to print a plurality of separate image patches and a plurality of pieces of identification information on a sheet, each of the plurality of separate image patches corresponding to a different piece of the plurality of pieces of identification information,
  wherein each of the plurality of separate image patches printed on the sheet includes two parts, one part of the two parts including larger dots than the other part of the two parts, with each separate image patch having a density difference between the one part including the larger dots and the other part, and wherein the density difference for each separate image patch is different from the density difference for each of the other separate image patches; and an input unit which inputs a piece of identification information from the plurality of pieces of identification information that corresponds to one of the separate image patches having a density difference between the one part including the larger dots and the other part, wherein, after the input unit inputs the piece of identification information, the causing unit causes the printing unit to print on a sheet an image generated using information related to the input piece of identification information that corresponds to one of the separate image patches having a density difference between the one part including the larger dots and the other part, and wherein the printed image generated using the information related to the input piece of identification information includes two parts, one part of the two parts including larger dots than the other part of the two parts.

2. The apparatus according to claim 1, wherein the printing unit is a printer.

3. The apparatus according to claim 1, wherein the apparatus further comprises the printing unit.

4. The apparatus according to claim 1, wherein the one part of the two parts of the printed image generated using the information related to the input piece of identification information that includes the larger dots has a higher density than the other part of the two parts, if the printed image generated using the information related to the input piece of identification information is copied.

5. The apparatus according to claim 1 wherein the printed image generated using the information related to the input piece of information is a copy-forgery-inhibited pattern image.

6. An apparatus comprising;
a first input unit which inputs a piece of density information from a plurality of pieces of density information;
a causing unit which causes a printing unit to print a plurality of separate image patches on the basis of the input piece of density information and a plurality of pieces of identification information on a sheet, each of the plurality of separate image patches corresponding to a different piece of the plurality of pieces of identification information,
wherein each of the plurality of separate image patches printed on the sheet includes two parts, one part of the two parts including larger dots than the other part of the two parts, with each separate image patch having a density difference between the one part including the larger dots and the other part, and wherein the density difference for each separate image patch is different from the density difference for each of the other image patches; and
a second input unit which inputs a piece of identification information from the plurality of pieces of identification information that corresponds to one of the separate image patches having a density difference between the one part including the larger dots and the other part,
wherein, after the second input unit inputs the piece of identification information, the causing unit causes the printing unit to print on a sheet an image generated using information related to the input piece of identification information that corresponds to one of the separate image patches having a density difference between the one part including the larger dots and the other part, and
wherein the printed image generated using the information related to the input piece of identification information includes two parts, one part of the two parts including larger dots than the other part of the two parts.

7. An apparatus comprising;
a first input unit which inputs a piece of information from a plurality of first pieces of information;
a causing unit which causes a printing unit to print on a sheet a plurality of separate image patches on the basis of the piece of information input by the first input unit and a plurality of second pieces of information, each of the plurality of image patches corresponding to a different piece of information of the second plurality of pieces of information,
wherein each of the plurality of separate image patches printed on the sheet includes two parts, one part of the two parts including larger dots than the other part of the two parts, with each separate image patch having a density difference between the one part including the larger dots and the other part, and wherein the density difference for each separate image patch is different from the density difference for each of the other separate image patches; and
a second input unit which inputs a piece of information from the plurality of the second pieces of information that corresponds to one of the separate image patches having a density difference between the one art including the larger dots and the other part,
wherein, after the piece of information is input by the second input unit, the causing unit causes the printing unit to print on a sheet an image generated using information related to the piece of information input by the second input unit that corresponds to one of the separate image patches having a density difference between the one part including the larger dots and the other part, and
wherein the printed image generated using the information related to the piece of information input by the second input unit includes two parts, one part of the two parts including larger dots than the other part of the two parts.

8. A method comprising:
a first causing step that causes a printing unit to print a plurality of separate image patches and a plurality of pieces of identification information on a sheet, each of the plurality of separate image patches corresponding to a different piece of the plurality of pieces of identification information,
wherein each of the plurality of separate image patches printed on the sheet includes two parts, one part of the two parts including larger dots than the other part of the two parts, with each separate image patch having a density difference between the one part including the larger dots and the other part, and wherein the density difference for each separate image patch is different from the density difference for each of the other separate image patches;
an inputting step that inputs a piece of identification information from the plurality of pieces of identification information that corresponds to one of the separate image patches having a density difference between the one part including the larger dots and the other part, and
a second causing step that, after the inputting step inputs the piece of identification information, causes the printing unit to print on a sheet an image generated using information related to the input piece of identification information that corresponds to one of the separate image patches having a density difference between the one part including the larger dots and the other part, wherein the printed image generated using the information related to the input piece of identification information includes two parts, one part of the two parts including larger dots than the other part of the two parts.

9. A method comprising:

a first inputting step that inputs a piece of information from a plurality of first pieces of information;

a first causing step that causes a printing unit to print on a sheet a plurality of separate image patches on the basis of the piece of information input in the first inputting step and a plurality of second pieces of information, each of the plurality of separate image patches corresponding to a different piece of information of the plurality of second pieces of information, wherein each of the plurality of separate image patches printed on the sheet includes two parts, one part of the two parts including larger dots than the other part of the two parts, with each separate image patch having a density difference between the one part including the larger dots and the other part, and wherein the density difference for each separate image patch is different from the density difference for each of the other separate image patches;

a second inputting step that inputs a piece of information from the plurality of the second pieces of information that corresponds to one of the separate image patches having a density difference between the one part including the larger dots and the other part; and a second causing step that, after the second inputting step inputs the piece of information from the plurality of the second pieces of information, causes the printing unit to print on a sheet an image generated using information related to the piece of information input in the second inputting step that corresponds to one of the separate image patches having a density difference between the one art including the larger dots and the other part, wherein the printed image generated using the information related to the piece of information input in the second inputting step includes two parts, one part of the two parts including larger dots than the other part of the two parts.

10. A non-transitory computer-readable medium containing code for causing an apparatus to perform a method comprising:

a first causing step that causes a printing unit to print a plurality of separate image patches and a plurality of pieces of identification information on a sheet, each of the plurality of separate image patches corresponding to a different piece of the plurality of pieces of identification information, wherein each of the plurality of separate image patches printed on the sheet includes two parts, one part of the two parts including larger dots than the other part of the two parts, with each separate image patch having density difference between the one part including the larger dots and the other part, and wherein the density difference for each separate image patch is different from the density difference for each of the other separate image patches;

an inputting step that inputs a piece of identification information from the plurality of pieces of identification information that corresponds to one of the separate image patches having a density difference between the one part including the larger dots and the other part; and a second causing step that, after the inputting step inputs the piece of identification information, causes the printing unit to print on a sheet an image generated using information related to the input piece of identification information that corresponds to one of the separate image patches having a density difference between the one part including the larger dots and the other part, wherein the printed image generated using the information related to the input piece of identification information includes two parts, one part of the two parts including larger dots than the other part of the two parts.

11. A non-transitory computer-readable medium containing code for causing an apparatus to perform a method comprising:

a first inputting step that inputs a piece of information from a plurality of first pieces of information;

a first causing step that causes a printing unit to print on a sheet a plurality of separate image patches on the basis of the piece of information input in the first inputting step and a plurality of second pieces of information, each of the plurality of separate image patches corresponding to a different piece of information of the plurality of second pieces of information, wherein each of the plurality of separate image patches printed on the sheet includes two parts, one part of the two parts including larger dots than the other part of the two parts, with each separate image patch having a density difference between the one part including the larger dots and the other part and wherein the density difference for each separate image patch is different from the density difference for each of the other separate image patches;

a second inputting step that inputs a piece of information from the plurality of the second pieces of information that corresponds to one of the separate in age patches having a density difference between the one part including the larger dots and the other part; and a second causing step that, after the second inputting step inputs the piece of information from the plurality of the second pieces of information, causes the printing unit to print on a sheet an image generated using information related to the piece of information input in the second inputting step that corresponds to one of the separate image patches having a density, difference between the one part including the larger dots and the other part, wherein the printed image generated using the information related to the piece of information input in the second inputting step includes two parts, one part of the two parts including larger dots than the other part of the two parts.

12. An apparatus comprising:

a setting unit configured to set a value selected by a user from plural different values; and a causing unit configured to cause a printing unit to print out on a sheet a copy-forgery-inhibited pattern image generated using information related to the set value, wherein the printed copy-forgery-inhibited pattern image generated using the information related to the set value includes a first part and a second part having larger dots than the first part, wherein, before the setting units sets the value selected by the user, the causing unit causes the printing unit to print out plural different separate image patches and the plural different values on a sheet, each of the plural separate image patches corresponding to a different one of the plural different values printed on the sheet, and wherein each separate image patch printed out on the sheet includes a first part and a second part having larger dots than the first part, with each separate image patch having a density difference between the first part and the second part having larger dots than the first part, and wherein the density difference for each separate image patch is different from the density difference for each of the other separate image patches.

13. A method comprising:
a first causing step that causes a printing unit to print out plural different separate image patches and plural values on a sheet, each of the plural separate image patches corresponding to a different one of the plural values printed on the sheet;
a setting step that sets a value selected by a user from the plural different values that corresponds to one of the separate image patches; and
a second causing step that causes the printing unit to print out on a sheet a copy-forgery-inhibited pattern image generated using information related to the set value, wherein the printed copy-forgery-inhibited pattern image generated using the information related to the set value includes a first part and a second part having larger dots than the first part, and
wherein each separate image patch printed out on the sheet includes a first part and a second part having larger dots than the first part, with each separate image patch having a density difference between the first part and the second part having larger dots than the first part, and wherein the density difference for each separate image patch is different from the density difference for each of the other separate image patches.

14. A non-transitory computer-readable medium containing code for causing an apparatus to perform a method comprising:
a first causing step that causes a printing unit to print out plural different separate image patches and plural values on a sheet, each of the plural separate image patches corresponding to a different one of the plural values printed on the sheet;
a setting step that sets a value selected by a user from the plural different values that corresponds to one of the separate image patches; and
a second causing step that causes the printing unit to print out on a sheet a copy-forgery-inhibited pattern image generated using information related to the set value, wherein the printed copy-forgery-inhibited pattern image generated using the information related to the set value includes a first part and a second part having larger dots than the first part, and
wherein each separate image patch printed out on the sheet includes a first part and a second part having larger dots than the first part, with each separate image patch having a density difference between the first part and the second part having larger dots than the first part, and wherein the density difference for each separate image patch is different from the density difference for each of the other separate image patches.

15. The apparatus according to claim 1, wherein one of the plurality of separate image patches has a density difference that is substantially zero.

16. The apparatus according to claim 1, wherein the causing unit causes the printing unit to print the plurality of separate image patches so that (i) the density of the one part including the larger dots in each separate image patch is different from the density of the one part including the larger dots in each of the other separate image patches, and (ii) the density of the other part in each separate image patch is different from the density of the other part in each of the other separate image patches.

17. The apparatus according to claim 1, wherein the causing unit causes the printing unit to print the plurality of separate image patches so that, for one of the two parts, the density is the same in each separate image patch.

18. The apparatus according to claim 17, wherein the causing unit causes the printing unit to print the plurality of separate image patches so that (i) the one part including the larger dots has the same density in each separate image patch, and (ii) the density of the other part in each separate image patch is different from the density of the other part in each of the other separate image patches.

* * * * *